(12) United States Patent
Gunter et al.

(10) Patent No.: US 12,124,783 B2
(45) Date of Patent: Oct. 22, 2024

(54) INITIALIZING ON-CHIP OPERATIONS

(71) Applicant: Google LLC, Mountain View, CA (US)

(72) Inventors: Michial Allen Gunter, Oakland, CA (US); Reiner Pope, Mountain View, CA (US); Pavel Krajcevski, San Francisco, CA (US); Clifford Biffle, Berkeley, CA (US)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 17/636,785

(22) PCT Filed: Aug. 20, 2020

(86) PCT No.: PCT/US2020/047120
§ 371 (c)(1),
(2) Date: Feb. 18, 2022

(87) PCT Pub. No.: WO2021/035015
PCT Pub. Date: Feb. 25, 2021

(65) Prior Publication Data
US 2022/0277125 A1    Sep. 1, 2022

Related U.S. Application Data

(60) Provisional application No. 62/890,149, filed on Aug. 22, 2019.

(51) Int. Cl.
*G06F 30/347* (2020.01)
*G06F 115/06* (2020.01)
*H04L 49/253* (2022.01)

(52) U.S. Cl.
CPC .......... *G06F 30/347* (2020.01); *H04L 49/253* (2013.01); *G06F 2115/06* (2020.01)

(58) Field of Classification Search
CPC .. G06F 30/347; G06F 2115/06; G06F 15/177; H04L 49/253; H04L 49/30; H04L 49/25; H04L 49/109; G06N 3/063
See application file for complete search history.

(56) References Cited

U.S. PATENT DOCUMENTS 7,804,504 B1 * 9/2010 Agarwal ............. G06F 15/7867
716/112
8,656,141 B1 * 2/2014 Agarwal ........... G06F 15/17381
710/22

FOREIGN PATENT DOCUMENTS

| CN | 108573304 | 9/2018 |
| CN | 109194499 | 1/2019 |

(Continued)

OTHER PUBLICATIONS

Notice of Allowance in Japanese Appln. No. 2022-512407, dated Apr. 17, 2023, 5 pages (with English translation).

(Continued)

*Primary Examiner* — Stacy Whitmore
(74) *Attorney, Agent, or Firm* — Fish & Richardson P.C.

(57) ABSTRACT

A method of configuring an integrated circuit including multiple hardware tiles, includes: establishing a data forwarding path through the multiple hardware tiles by configuring each hardware tile, except for a last hardware tile, of the multiple hardware tiles to be in a data forwarding state, in which configuring each hardware tile, except for the last hardware tile, to be in a forwarding state includes installing a respective forwarding state counter specifying a corresponding predefined length of time that the hardware tile is in the data forwarding state; supplying, along the data forwarding path, each hardware tile of the plurality of hardware tiles with a respective program data packet comprising program data for the hardware tile; and installing, for (Continued)

each hardware tile of the multiple hardware tiles, the respective program data.

21 Claims, 13 Drawing Sheets

(56) References Cited

FOREIGN PATENT DOCUMENTS

| JP | H09-091262 | 4/1997 | |
|----|------------|--------|---|
| JP | 2009-271724 | 11/2009 | |
| KR | 10-1017977 | 3/2011 | |
| KR | 10-2015-0077372 | 7/2015 | |
| TW | 201928712 | 7/2019 | |
| TW | 1695279 | 6/2020 | |
| WO | WO-2012154612 A1 * | 11/2012 | .......... G06F 11/1458 |

OTHER PUBLICATIONS

International Preliminary Report on Patentability in International Appln. No. PCT/US2020/047120, dated Mar. 3, 2022, 7 pages.

International Search Report and Written Opinion in International Appln. No. PCT/US2020/047120, dated Nov. 27, 2020, 12 pages.

Office Action in Taiwan Appln. No. 109128679, dated Apr. 21, 2021, 16 pages (with English translation).

Office Action in Taiwan Appln. No. 109128679, dated Jul. 28, 2021, 8 pages (with English translation).

Office Action in Chinese Appln. No. 202080074234.4, mailed on Nov. 13, 2023, 12 pages (with English translation).

Office Action in Korean Appln. No. 10-2022-7009163, mailed on Jul. 15, 2024, 17 pages (with English translation).

Office Action in European Appln. No. 20768147.9, mailed on Sep. 6, 2024, 6 pages.

* cited by examiner

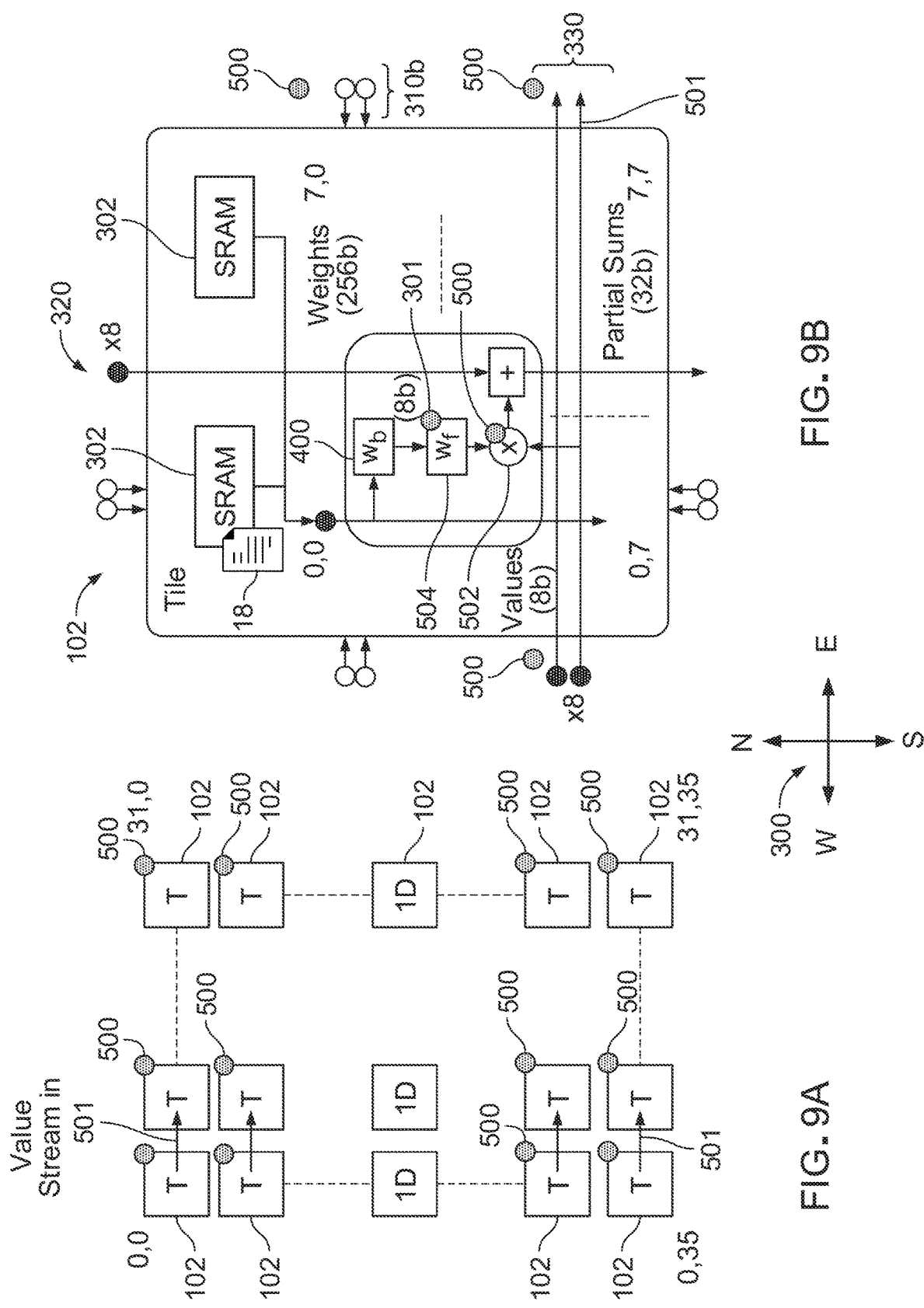

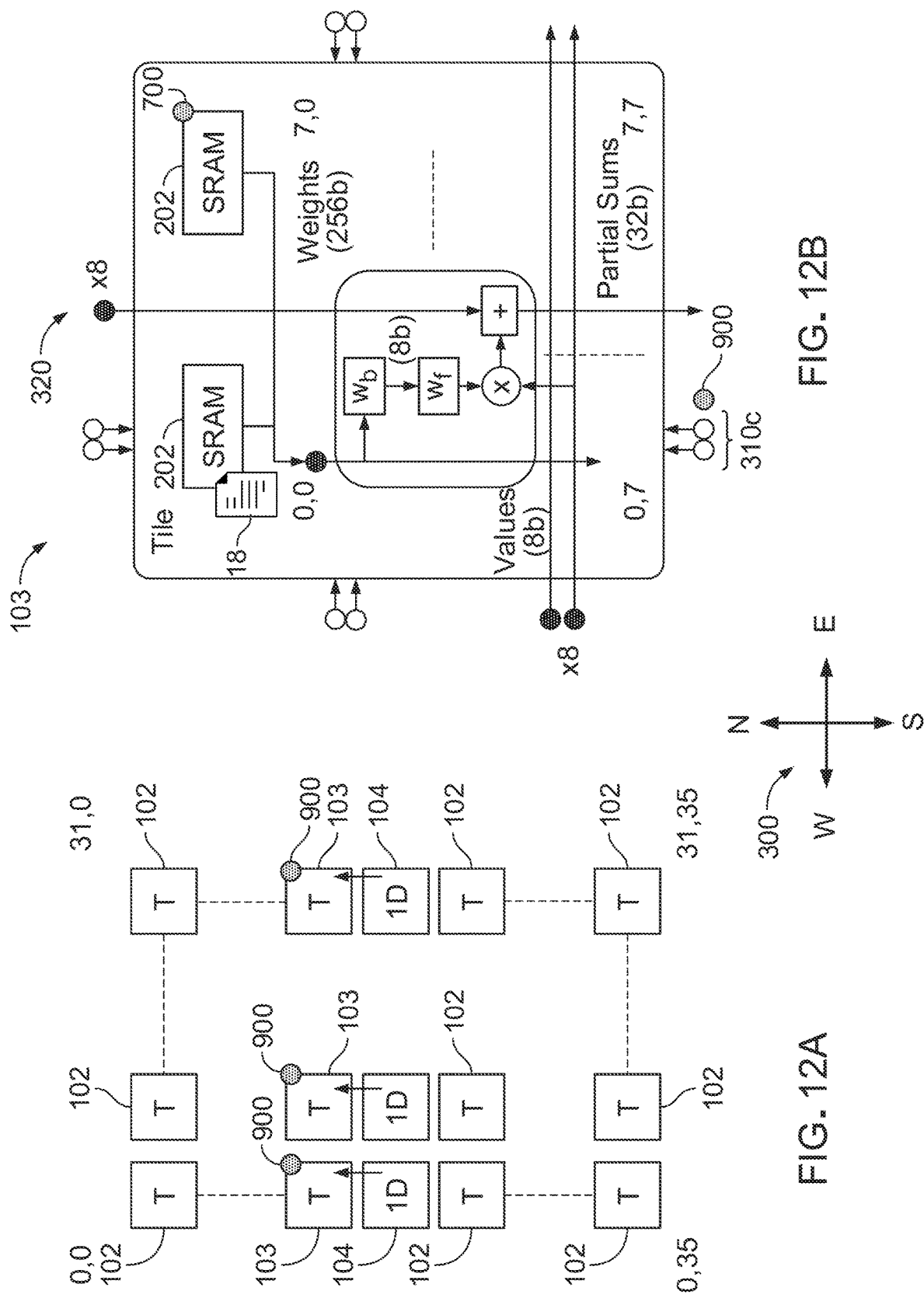

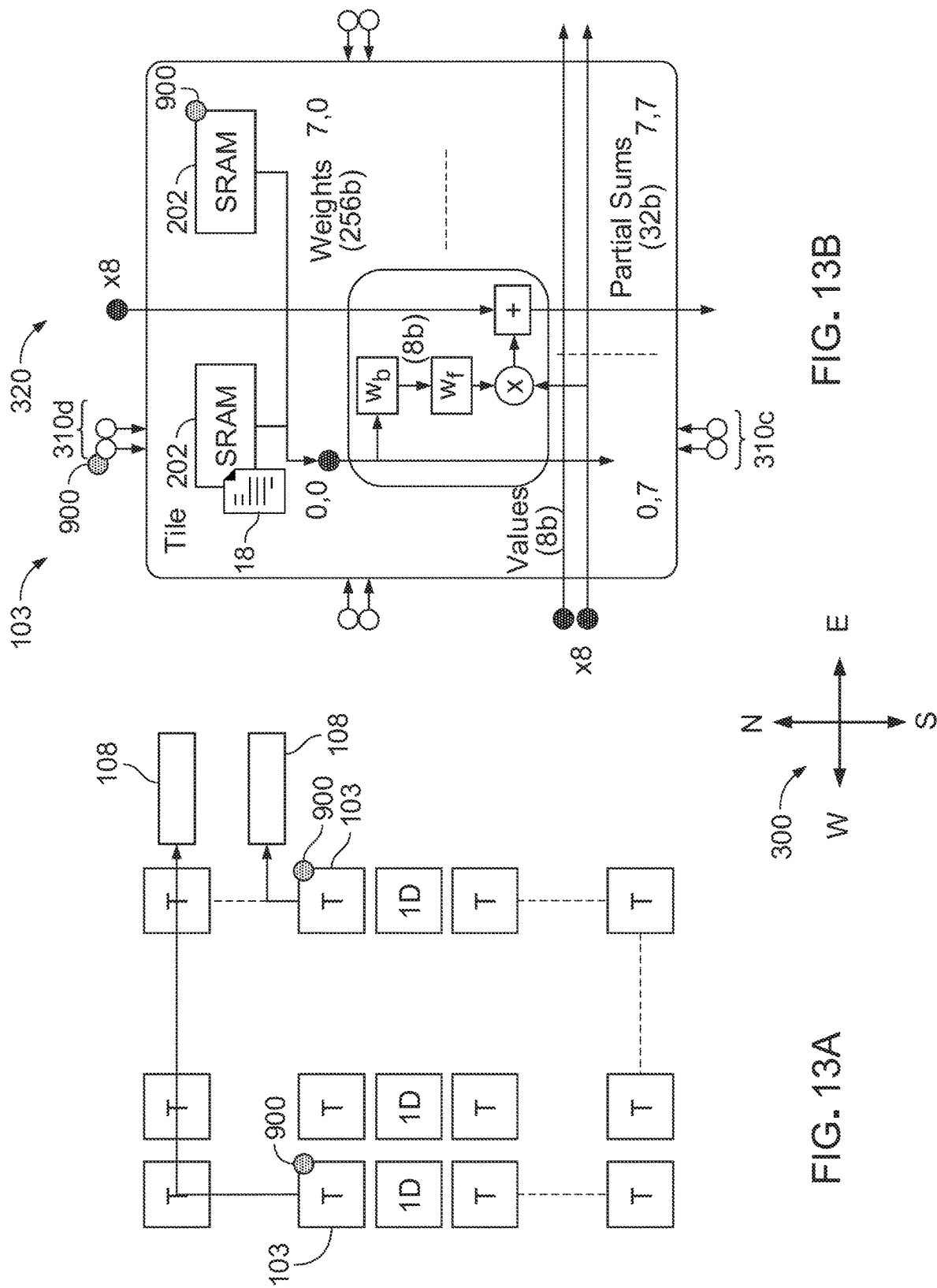

INITIALIZING ON-CHIP OPERATIONS

CROSS-REFERENCE TO RELATED APPLICATIONS

This application is a National Stage Application under 35 U.S.C. § 371 and claims the benefit of International Application No. PCT/US2020/047120, filed on Aug. 20, 2020, which claims priority to U.S. Patent Application Ser. No. 62/890,149, filed on Aug. 22, 2019. The disclosures of the prior applications are considered part of and are incorporated by reference in the disclosure of this application.

TECHNICAL FIELD

The present disclosure relates to integrated circuit operations and initializing operations of different integrated circuit hardware blocks.

BACKGROUND

Data transmitted by processors and microcontroller chips often includes encoded information, such as a header, that specifies where the data is to be sent. Each other processor or microcontroller that receives such data must therefore include decoding logic to decode the header and make a determination whether the received data should be saved, installed to initialize the processor or microcontroller, or forwarded to yet another circuit.

SUMMARY

In general, the disclosure relates to initializing configuration of a semiconductor chip, where operations performed on the chip are explicitly scheduled (the operations may be said to be "deterministic"). More specifically, the disclosure relates to a semiconductor chip divided into individual hardware blocks, where data is transferred among the hardware blocks according to the explicit schedule. Rather than constructing the hardware blocks to include decoding logic or similar features that determine, based on the contents of the received data, whether to install, save to memory or forward received data to another hardware block, the hardware blocks are instead configured in advance to handle data according to predetermined actions. In this way, the hardware blocks may be characterized as "agnostic" about the ultimate destination of the data that is received.

In general, in some aspects, the subject matter of the present disclosure is embodied in methods of configuring an integrated circuit that includes multiple hardware tiles, in which the methods include: establishing a data forwarding path through the multiple hardware tiles by configuring each hardware tile, except for a last hardware tile, of the multiple hardware tiles to be in a data forwarding state, in which configuring each hardware tile, except for the last hardware tile, to be in a forwarding state includes installing a respective forwarding state counter specifying a corresponding predefined length of time that the hardware tile is in the data forwarding state; supplying, along the data forwarding path, each hardware tile of the plurality of hardware tiles with a respective program data packet comprising program data for the hardware tile; and installing, for each hardware tile of the multiple hardware tiles, the respective program data.

Implementations of the methods may include one or more of the following features. For example, in some implementations, the forwarding state counter of each hardware tile, except for the last hardware tile, of the multiple hardware tiles, is installed upon receiving a first data packet passed through the data forwarding path. The first data packet may include a program data packet including program data for the last hardware tile of the multiple hardware tiles.

In some implementations, installing the respective forwarding state counter for each hardware tile includes defining the forwarding state counter in a trigger table of the hardware tile. When the forwarding state counter of each hardware tile reaches the corresponding predefined length of time, the trigger table may trigger installation of program data for the hardware tile and cause the hardware tile to exit the data forwarding state. For each hardware tile including a respective forwarding state counter, the corresponding predefined length of time of the forwarding state counter is a function of a number of subsequent hardware tiles in the data forwarding path.

In some implementations, each hardware tile of the multiple hardware tiles stores the respective program data for the hardware tile in local memory.

In some implementations, each hardware tile includes a respective forwarding state counter forwards at least one program data packet to at least one other hardware tile in the data forwarding path.

In some implementations, each hardware tile includes a systolic array of circuit elements.

In some implementations, the multiple tiles are arranged in a one dimensional or two dimensional array.

In some implementations, the methods further include installing on at least some of the multiple hardware tiles, a respective kickoff counter specifying a corresponding predefined length of time until the hardware tile starts operations defined by the program data installed on the hardware tile. The respective kickoff counter of each hardware tile, except for the last hardware tile, of the multiple hardware tiles, may be installed upon receiving the first data packet. The predefined length of time for each kickoff counter may be different. The predefined length of time for each kickoff counter may be a function of a number of hardware tiles in the data forwarding path. The predefined length of time for each kickoff state counter may be defined so that the plurality of hardware tiles execute their respective program data simultaneously. Installing the respective kickoff counter of each hardware tile may include defining the kickoff counter in a trigger table of the hardware tile.

In general, in some other aspects, the subject matter of the present disclosure may be embodied in methods of configuring an integrated circuit that include multiple hardware tiles, in which the methods include: establishing a data forwarding path through each hardware tile of the multiple tiles, except for a last hardware tile of the multiple tiles, in which establishing the data forwarding path includes sequentially configuring each hardware tile of the data forwarding path by (a) installing program data for the tile, (b) configuring the tile to be in a forwarding state, and (c) installing a program kickoff counter specifying a corresponding predefined length of time that the hardware tile is in the data forwarding state.

Implementations of these methods may include one or more of the following features. For example, in some implementations, for a particular tile of the data forwarding path, the predefined length of time is a function of a number of tiles within the plurality of tiles that do not yet have program data installed.

In some implementations, once each program kickoff counter reaches the corresponding predefined length of time, the tile on which the program kickoff counter is installed begins executing operations according to the program data installed on the tile.

Various implementations include one or more of the following advantages. For example, in some implementations, the processes described herein allows configuration of multiple hardware blocks located internally within an array of hardware blocks to be configured without requiring the internal hardware blocks to be directly wired to their data sources. In some implementations, the processes described herein allow configuration of hardware blocks without the need to encode destination data within a data packet. In some implementations, the processes described herein allow hardware blocks to be configured without the need to install decoding logic in the hardware blocks.

The details of one or more embodiments are set forth in the accompanying drawings and the description below. Other features and advantages will be apparent from the description, the drawings, and the claims.

BRIEF DESCRIPTION OF THE DRAWINGS

FIGS. 7A, 8A, 9A, 10A, 11, 12A and 13A are schematics that illustrate an overview of a data flow through an ASIC at different times in an exemplary process implemented by the ASIC.

FIGS. 7B, 8B, 9B, 10B, 12B and 13B are schematics that illustrate detail of data flow within a single tile of an ASIC at the times associated with FIGS. 7A, 8A, 9A, 10A, 12A and 13A, respectively.

DETAILED DESCRIPTION

Figure 1:
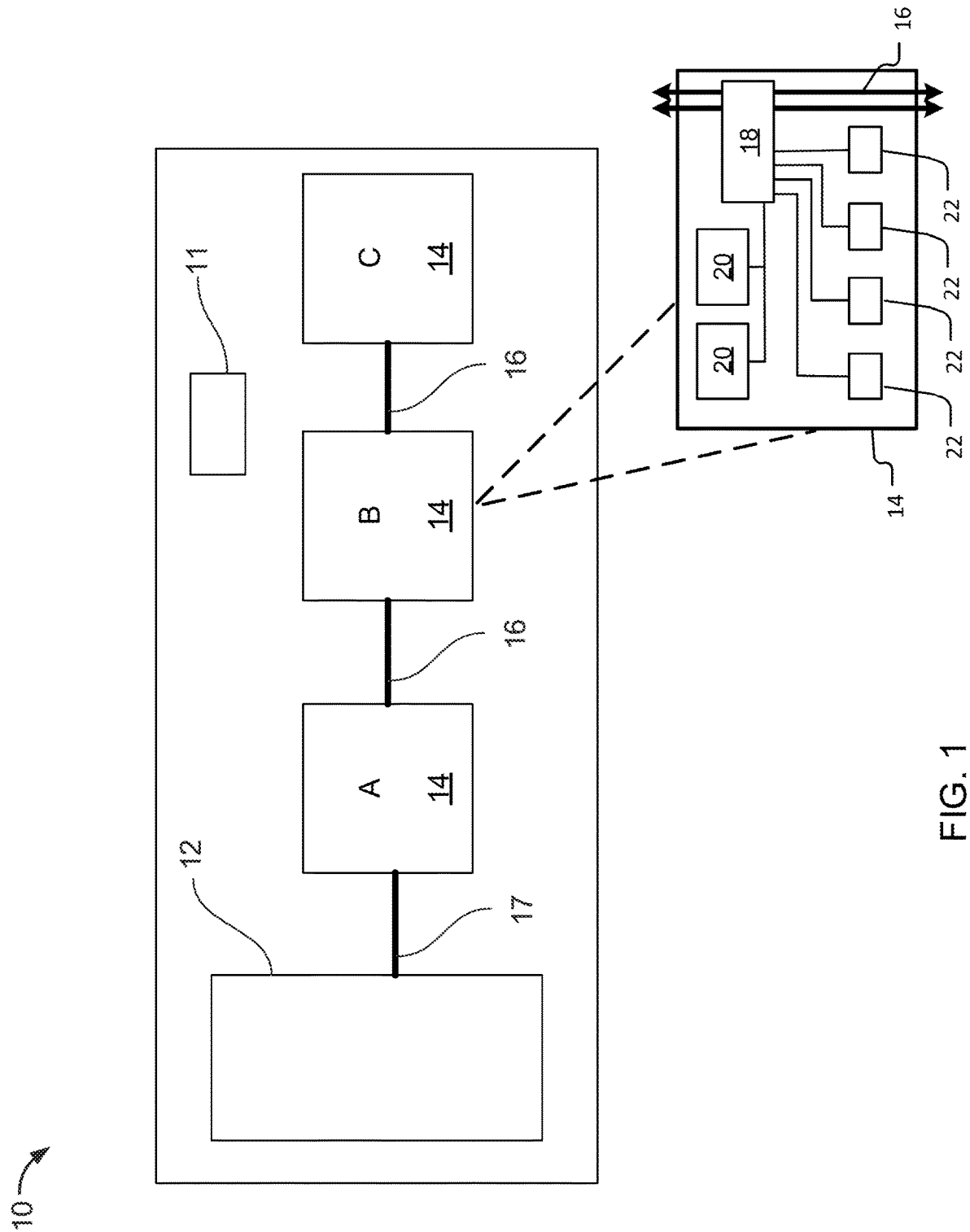
FIG. 1 is a schematic that illustrates an example integrated circuit device configured to operate according to scheduled operations.

In general, the present disclosure relates to initializing configuration of a semiconductor chip, where operations performed on the chip are explicitly scheduled (the operations may be said to be "deterministic"). In an example, the semiconductor chip may be divided into individual hardware blocks, where data is transferred among the hardware blocks according to the explicit schedule. More specifically, the individual hardware blocks may operate according to individualized operation schedules to perform a coordinated program executed by the semiconductor chip as a whole. In other words, the individual hardware blocks execute their respective operations at scheduled times according to a clock (e.g., a counter) rather than, e.g., executing operations in response to control signals or according to an unscheduled sequential list of process instructions. Each hardware block represents a relevant set of replicated logic such as a subset of electrical circuitry (e.g., logic circuitry) on a chip that is configured to perform a particular set of tasks independent of tasks performed by other hardware blocks. These operations include, but are not limited to, data forwarding operations, initialization operations, matrix operations, vector operations, scalar operations, logic operations, memory access operations, external communication operations, or a combination thereof.

Rather than constructing a hardware block to include decoding logic or similar features that determine whether received data should be installed (e.g., for initializing program operations in the hardware block), saved in memory, or forwarded to another hardware block, the hardware blocks of the present disclosure are instead configured in advance to handle data in a specific manner. For example, a hardware block may be configured in advance to install received data (e.g., to initialize program operations in the hardware block), save received data to memory, or forward the received data to another hardware block. In this way, the hardware blocks may be characterized as being preconfigured to handle data in a specific way, independent of the data that is received. The hardware blocks may be configured in advance to handle data in a specific manner at/during predefined times during execution of a schedule of operations, i.e. the hardware blocks may be configured to change the way they handle data at predefined times.

Each hardware block executes an individual schedule of operations specific to the hardware block. Together the individual schedules for each hardware block represent a complete program (e.g., a neural network operation) that is executed by the chip as a whole. Prior to performing such operations, however, the program data specifying the particular operations to be performed is delivered to and installed on each hardware block. To provide the program data to each hardware block without including decoding logic, one option is to wire the source of program data directly to each block. For large numbers of hardware blocks, the amount of wiring may require substantial amount of real estate and become untenable as a solution.

Alternatively, as described in the present disclosure, only some of the hardware blocks (e.g., the outermost hardware blocks in a two-dimensional array of blocks) are directly tied to the source of program data. To reach a hardware block located internally in the array, groups of hardware blocks may be placed in a data forwarding state such that each group establishes a data forwarding path to the internal block. Each hardware block in a forwarding state may automatically reconfigure into a new non-data forwarding state after a predetermined amount of time specific to that hardware block. For example, one or more hardware blocks may automatically reconfigure into a data storing state that stores data received in the hardware block. Alternatively, or in addition, one or more hardware blocks may automatically reconfigure into a data initialization state that initializes a program to be run by the hardware block, in which the program is defined by the received data. In some cases, the hardware block may perform the scheduled operations specified by the program data at predetermined counter times. In some implementations, the semiconductor chip including the hardware blocks is an application-specific integrated circuit (ASIC) designed to perform machine learning operations. An ASIC includes, e.g., an integrated circuit (IC) that is customized for a particular use. For example, an ASIC may be designed to perform operations of machine learning models including, e.g., recognizing objects in images as part of deep neural networks, machine translation, speech recognition, or other machine learning algorithms. When used as an accelerator for a neural network, for instance, an ASIC can receive inputs to the neural network and compute a neural network inference for the inputs. Data inputs to a neural network layer, e.g., either the input to the neural network or the outputs of another layer of the neural network, can be referred to as activation inputs. The inferences can be computed in accordance with respective sets of weight inputs associated with the layers of the neural network. For example, some or all of the layers may receive a set of activation inputs and process the activation inputs in accordance with the set of weight inputs for the layer to generate outputs. Moreover, the repetitive nature of computational operations performed to compute neural network inferences are conducive to explicitly scheduled chip operations.

FIG. 1 is a schematic that illustrates a simplified example of an integrated circuit chip 10 according to the present disclosure. The chip 10 can be a general purpose integrated circuit or a special purpose integrated circuit. For example, the chip 10 can be an ASIC, a field programmable gate array (FPGA), a graphics processing unit (GPU), or any other suitable integrated circuit. The chip 10 includes multiple hardware blocks 14 (labeled "A," "B," and "C"), also referred to herein as "tiles," arranged in an array. The hardware tiles 14 may be coupled to one another using a data bus 16. Although only three hardware tiles 14 are shown in FIG. 1, the chip 10 may include other numbers of hardware tiles such as, e.g., 10, 20, 30, 40, 50, 100, or 200, among others. Further, although the hardware tiles 14 are depicted as being arranged in a linear array, the hardware tiles 14 may be arranged in other configurations as well, such as a two-dimensional array having multiple rows and multiple columns. The chip 10 also includes a communication interface 12. The communication interface 12 is coupled to at least a first hardware tile 14 (e.g., tile A) using a data bus 17. The communication interface 12 may include, e.g., one or more sets of serializer/deserializer (SerDes) interfaces and a general purpose input/output (GPIO) interface. The SerDes interface is configured to receive data for the ASIC 10 (e.g., configuration data or program data for the hardware tiles as described herein) and to output data from the ASIC 10 to an external circuit. The chip 10 is shown in simplified manner for purposes of illustration and discussion. However, in some implementations, the chip 10 will include additional components such as memory and other circuitry appropriate to the purpose of the chip 10.

The hardware tiles 14 represent sets of replicated logic such as a subset of electrical circuitry (e.g., logic circuitry) on the chip 10 that is designed to perform a particular set of tasks independent of tasks performed by other hardware tiles 14. Each hardware tile 14 can represent the same or different type of circuitry, e.g., hardware tiles A, B and C can represent tiles of a special purpose chip designed to execute machine learning functions (discussed in more detail below). For example, hardware tiles A, B and C can represent computational nodes of a neural network configured to perform matrix operations.

Operations of the hardware tiles 14 may be performed at predetermined times in accordance with a common clock signal on the chip 10. Each hardware tile 14 operates according to its own individualized operations schedule. The operations schedules each represent a portion of a program (e.g., a "sub-program") to be executed by the chip 10 as a whole, and each operation schedule represents that portion of the program that is to be executed by a corresponding individual hardware tile 14. The operations schedule includes a set of program operations to be executed by the hardware tile 14 at predetermined counter values. In other words, the operations schedule can be thought of as a list of timers that trigger particular operations (see, e.g., FIG. 4) to be executed by a particular hardware tile 14 at prescheduled "chip times." For example, each schedule can include a list of execution counter values (e.g., execution times) with an associated operation to be executed at the counter value. In some examples, each operation is represented by the scheduled counter value and data, such as an operation code, that identifies the operation to be executed by a particular hardware tile 14 at the scheduled counter value. The operations executed by hardware tiles 14 may be coordinated with operations executed by the other hardware tiles. The operations schedule may be implemented on each tile using a "trigger table," described in more detail below.

As shown in FIG. 1, each hardware tile 14 can include control circuitry 18, local memory 20, and one or more computational units 22. In some implementations, the programs specified by an operation schedule can be stored in the local memory 20 of the hardware tile 14. The operational units 22 represent electrical circuitry configured to perform specific computations, e.g., addition, subtraction, multiplication, logical operations, etc. The control circuitry 18 can be configured to read and execute the operations of the programs stored in memory 20. For example, the control circuitry 18 can include control elements such as multiplexers and flip flops that route data between memory 20, input buffers or busses 16 and appropriate computations units 22 to execute the scheduled operations. As noted herein, the operational schedule of a program can serve as a series of timers that trigger the control circuitry 18 to begin the execution of specific functions at specific counter values. Thus, the operation schedule can trigger the control elements of the control circuitry 18 to route data within the hardware tile 14 to appropriate computation units 22 in order to execute a scheduled operation at the scheduled time.

As explained herein, the program data that defines the operation schedule for the hardware tiles must first be provided to and initialized on each hardware tile 14. To reach tiles not directly coupled to the communication interface 12, groups of hardware tiles 14 (e.g., tiles A and B) may be individually placed in a data forwarding to establish a data forwarding path. The program data for individual tiles 14 may then be sent along the forwarding path from the communication interface 12. Once each hardware tile 14 receives its corresponding program data, the tile 14 may automatically reconfigure into a new non-data forwarding state after a predetermined amount of time. In this new state, the tile 14 may be initialized to execute the operations defined by the program data or, alternatively, perform some other function.

Figure 2:
FIG. 2 is a flow chart that illustrates an example process for initializing hardware tiles with configuration data.

FIG. 2 is a flow chart depicting an exemplary process (30) for loading and initializing hardware tiles so as to execute predefined programs. The process (30) is described with respect to the exemplary chip 10 shown in FIG. 1 but is applicable to other chips that include arrays of hardware tiles. For the purposes of this disclosure, a configuration data packet includes configuration data that causes a tile to change state, e.g., to change from a state in which the tile is operable to read data in a received data packet to a state in which the tile is operable to forward a received data packet or to change from a state in which the tile is operable to forward a received data packet to a state in which the tile is operable to read data in a received data packet. For the purposes of this disclosure, a program data packets include program data that defines the operation schedules for the hardware tiles.

In a first step (32), a data forwarding path is established along a group of hardware tiles 14 (e.g., tiles A, B and C) in the array of hardware tiles 14. By establishing the data forwarding path, data from the communication interface 12 can reach internal tiles 14 that are not directly coupled to the interface 12 by a communication bus 16. Establishing the data forwarding path includes configuring (33) each hardware tile 14, with the exception of a last hardware tile (e.g., hardware tile C) in the array, to be in a forwarding state for a corresponding predefined amount of time. While in a forwarding state, a tile 14 is operable to forward a received data packet to one or more of the other tiles 14 in the data forwarding path via one or more data links.

The process (33) of configuring each hardware tile 14, with the exception of a last hardware tile in an array, to be in a forwarding state includes successively sending to each hardware tile 14, with the exception of the last tile 14, corresponding configuration data that configures the tile 14 to be in a forwarding state. Sending configuration data may be achieved in multiple different ways. For example, in some implementations, sending configuration data includes sending a single data packet with multiple headers to the first tile in the array. Each header of the data packet may contain tile-agnostic data that configures the tile to change state. Upon receiving the data packet, the first tile in the array will read a first header of the data packet and change state based on the configuration data of the first header. For instance, the configuration data may change the state of the tile into a forwarding state. The data packet then may be passed by the first tile to the next (second) tile in the array, where the second tile reads a second header of the data packet and change state based on the configuration data of the second header. For instance, the configuration data may change the state of the second tile into a forwarding state. This may continue for each tile in the array or for only the first N−1 tiles of an N-tile array.

In some implementations, separate data packets are transmitted to the tiles, each data packet having its own configuration data. For instance, a first data packet having configuration data may be sent to the first tile, after which the first tile may install the configuration data (e.g., to change the first tile state to a forwarding state). Then a second data packet having configuration data may be sent to the first tile, which forwards the second data packet to a second tile in the array. Upon receiving the second data packet, the second tile may install the configuration data (e.g., to change the second tile state to a forwarding state). This may continue for each tile in the array or for only the first N−1 tiles of an N-tile array.

Figure 3:
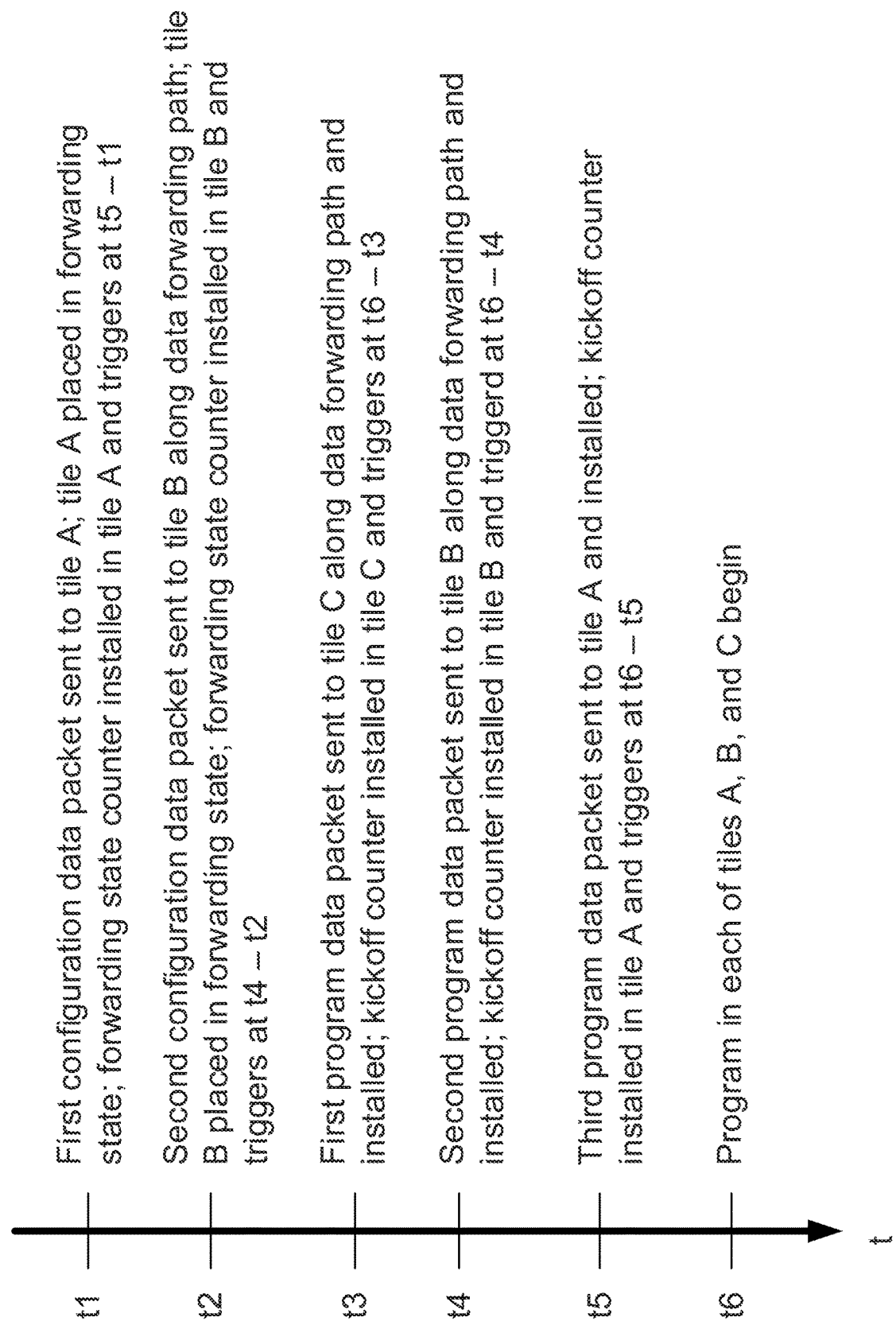
FIG. 3 is a flow diagram illustrating an example of a process for initializing a group of hardware tiles.

An exemplary process of establishing the forwarding data path along hardware tiles A, B, and C is also illustrated in the time-flow diagram of FIG. 3. For instance, in an example, a data source, such as the communication interface 12, will begin by sending a first data packet including configuration data to the first hardware tile A shown in FIG. 1 at a time t1. Upon receiving the first data packet containing the configuration data, the first hardware tile A does not store the first data packet. Instead, responsive to receiving the first data packet, the first hardware tile A is configured to operate in a data forwarding state. In the data forwarding state, the hardware tile A will forward data that it receives rather than store the received data in local memory. For instance, the configuration data may cause the tile A to be configured to forward data to a next adjacent tile in the array such as tile B. The configuration data thus includes data that, when installed in the first tile A, causes the first tile to be placed in the forwarding state. The first hardware tile A is capable of reading the first data packet because it is set in a "listen for configuration packets" state. That is, the first hardware tile A is already configured at this point to read data packets that arrive at the first hardware tile. Such a configuration state for each tile 14 may be set in some implementations after a reset operation, in which the chip 10 is reset. Thus, the first packet sent, the one that configures the "data forwarding state," contains tile-agnostic data that simply configures a tile to forward data and stop "listening."

More generally, each hardware tile in the array of hardware tiles may be initialized in what is referred to as the "listen for configuration packets" state, also referred to herein as a "listening" state. As explained above, this listen for configuration state may be implemented after a reset operation, in which chip 10 is reset. Upon receiving a data packet in the listen for configuration state, each tile in the listening state will read and "consume" a header, which contains tile-agnostic data that configures the tile to change state, e.g., to switch to a forwarding state and stop "listening" for configuration data. Tiles configured to be in a listening state therefore may not require decoding logic. Furthermore, it is noted that, in some implementations, there are as many headers containing tile configuration data provided to the array as there are hardware blocks along the path for a particular state change operation, since each block will consume one header. For instance, to change N number of tiles in the same manner (e.g., to create a forwarding path constituted by N tiles) may require sending a string of N sequential data packets, each of which includes configuration data that causes a tile to change to a different state (e.g., configuration data that causes a tile to change from a listening state to a forwarding state).

Thus, subsequent to sending the first data packet, the data source (e.g., communication interface 12) sends, at a time t2, a second data packet including configuration data to the first hardware tile A. Because hardware tile A is in a forwarding state, tile A will forward the second data packet to another tile in the array. For instance, tile A may forward the second data packet to hardware tile B. Upon receiving the second data packet containing the configuration data, the second hardware tile B, which is in a listening state, does not store the second data packet. Instead, responsive to receiving and reading the second data packet, the second hardware tile B is configured to operate in a data forwarding state. In the data forwarding state, the hardware tile B will forward data that it receives rather than store the received data in local memory. For instance, the configuration data within the second data packet may cause the tile B to be configured to forward data to a next adjacent tile in the array such as tile C.

In view of the foregoing, both tiles A and B are in a forwarding state, establishing a data forwarding path along hardware tiles A, B and C. Because hardware tile C is the last tile within the array, there is no need to configure hardware tile C to be in a forwarding state. Rather, tile C can remain configured in a "listening" state ready to receive and install program data for executing scheduled operations as described herein.

Because it may be desirable to also receive and install program data in the remaining hardware tiles, the hardware tiles configured in data forwarding states are scheduled to sequentially exit the data forwarding state at predefined points in time. For instance, tiles A and B may be configured to sequentially exit their respective data forwarding states after the last hardware tile (e.g., hardware tile C) has received and installed its program data. In this way, each hardware tile in a forwarding state shifts back to a state where it can receive and install program data intended for that hardware tile.

Configuring a hardware tile to exit the forwarding state may include, for example, installing a respective forwarding state counter on each tile placed in a forwarding state. The installation of the forwarding state counter in a tile may occur as part of the change in state of a tile from a listening state to a forwarding state, e.g., when the tile receives a configuration data packet. A forwarding state counter includes a counter that counts down (or up) until a predefined period of time has passed. While the forwarding state counter counts down (or up), the hardware tile on which the counter is installed will remain in the forwarding state. When the forwarding state counter reaches the predefined period of time, the counter may induce a trigger to fire that causes the hardware tile to exit the forwarding state. For instance, in some implementations, a trigger may fire that causes the hardware tile 14 to be reconfigured so that for any new data packet that is received at the tile 14, the data packet is saved to a local memory (e.g., memory 20) on the tile 14. Alternatively, or in addition, the trigger may cause the hardware tile 14 to reconfigure so that it installs data from memory or installs data from any new data packets that the tile 14 receives. Alternatively, or in addition, the trigger may cause the hardware tile 14 to reconfigure so that the tile returns to the listening state. The counter installed on the tile 14 may be synchronized with a global clock on the chip 10 or a local clock running on the tile 14. The predefined period of time may include multiple clock cycles. For example, the predefined period of time may include 2, 5, 10, 20, 50 or 100 clock cycles, among others. The predefined period of time may lie in the range [2, 100] clock cycles, for example in the range [10, 50] clock cycles, such as 20 clock cycles. The predefined period of time for the counter may be defined in the configuration data that is read by the tile upon receiving a configuration data packet.

The hardware tiles 14 configured in forwarding states (e.g., tiles A and B) should not exit their respective forwarding states all at once. Instead, since the hardware tiles 14 in the array share a forwarding data path, they will each receive their program data packets at a different time. Therefore, each tile exits its forwarding state at a different time, and the predefined length of time for each forwarding state counter is different. The predefined length of time specified for each forwarding state counter is a function of the number of hardware tiles within the data forwarding path to which a current hardware tile forwards data packets. For instance, in the data forwarding path established by tiles A, B, and C of FIG. 1, there are two hardware tiles (B and C) to which the first tile A forwards data. Therefore, the predefined period of time associated with the forwarding state counter on tile A is a function of the time to transmit program data to and install the program data on tiles B and C. Referring to FIG. 3, this may occur, e.g., at a time equivalent to the difference between when the first hardware tile A is configured in the forwarding state (at t1) and when the first hardware tile A receives a data program packet intended to be installed on tile A (at t5), i.e., at a time of t5–t1. Similarly, in the data forwarding path established by tiles A, B, and C of FIG. 1, there is one hardware tile (C) to which the second tile B forwards data. Therefore, the predefined period of time associated with the forwarding state counter on tile B is a function of the time to transmit program data to and install the program data on tile C. Referring to FIG. 3, this may occur, e.g., at a time equivalent to the difference between when the second hardware tile B is configured in the forwarding state (at t2) and when the second hardware tile B receives a data program packet intended to be installed on tile B (at t4), i.e., at a time of t4–t2. The specific times associated with each forwarding state counter may be calculated in advance and included in the configuration data provided with the first and second data packets. Hardware tile C is not set in a forwarding state and therefore is not configured to include a forwarding state counter.

After the forwarding data path is established, the data source (e.g., communication interface 12) supplies (34) the hardware tiles 14 with their respective program data packets along the data forwarding path. The program data packets include program data that defines the operation schedules for the hardware tiles. The program data packets may be supplied sequentially so that the last hardware tile in the data forwarding path (e.g., the hardware tile furthest from the data source) receives its program data first, while the first hardware tile in the data forwarding path (e.g., the hardware tile closest to the data source) receives its program data last. As the program data packets are received, they may be installed (36) on the hardware tiles.

For example, in the data forwarding path established by hardware tiles A, B and C in FIG. 1, the communication interface 12 sends a first program data packet at a time t3 to hardware tile A, which then forwards the first program data packet to hardware tile B, which then forwards the first program data packet to hardware tile C. Upon receiving the first program data packet, the hardware tile C may save the first program data packet to local memory (e.g., memory 20) and/or install the program data contained within the packet.

Subsequently, the communication interface 12 sends a second program data packet at a time t4 to hardware tile B. Before hardware tile B can save and/or install the program data contained within the second program data packet, however, the forwarding state counter installed on the hardware tile B fires a trigger that causes the hardware tile B to change from a forwarding state to a new state configured to save and/or install data packets that hardware tile B receives. As explained herein, this triggering may occur at a time of t4–t2. In this way, the second program data packet is retained at hardware tile B instead of forwarded to hardware tile C. Subsequently, the communication interface 12 sends a third program data packet at a time t5 to hardware tile A. Before hardware tile A can save and/or install the program data contained within the second program data packet, however, the forwarding state counter installed on the hardware tile A fires a trigger that causes the hardware tile A to change from a forwarding state to a new state configured to save and/or install data packets that hardware tile A receives. As explained herein, this triggering may occur at a time of t5–t1. In this way, the third program data packet is retained at hardware tile A instead of forwarded to hardware tile B.

In some implementations, it is desirable that all the hardware tiles in the array execute their installed/initialized programs at the same time. In such cases, the hardware tiles that are the first to receive and initialize/install their program data wait until other hardware tiles in the array also have received and initialized/installed their respective program data. The time at which all hardware tiles begin execution of their installed program data is referred to as the "kickoff" time. To ensure that each hardware tile kicks off at the same time, the installation of the data program packets (36) may include, e.g., configuring each hardware tile to include a corresponding program kickoff counter (37), also referred to herein as a kickoff state counter.

A kickoff state counter includes a counter that counts down (or up) until a predefined period of time has passed. The predefined period of time specifies for each hardware tile specifies the time until operations defined in the program data within that tile begin. While the kickoff state counter counts down (or up), the hardware tile on which the counter is installed will remain in a holding state during which no operations are executed. When the kickoff state counter reaches the predefined period of time, the counter may induce a trigger to fire that causes the hardware tile to begin execution of the operations defined by the program data within the tile. The predefined period of time for each kickoff state counter is calculated to be a value that results in all the hardware tiles within the array executing their installed/initialized programs simultaneously. As explained herein, the predefined period of time of each kickoff state counter may be different.

For instance, in some implementations, a trigger may fire that causes the hardware tile 14 to begin execution of operations defined in program data that has been previously received at the tile 14 and stored in the tile's local memory (e.g., memory 20). The predefined period of time may include multiple clock cycles. For example, the predefined period of time may include 2, 5, 10, 20, 50 or 100 clock cycles, among others. As explained herein, the kickoff state counter installed on a tile 14 is synchronized with the other kickoff state counters with respect to a global clock. Since the hardware tiles 14 in the array share a forwarding data path, they will each receive and install their program data packets at a different time. That is, each tile 14 waits a different amount of time until it can begin executing operations, and the predefined length of time for each kickoff state counter is different. The predefined length of time specified for each kickoff state counter may be, e.g., a function of the number of hardware tiles that have still yet to receive and install their program data. This ensures that all tiles within the array execute their installed/initialized programs simultaneously. For instance, in the data forwarding path established by tiles A, B, and C of FIG. 1, once hardware tile C receives its program data, tile C waits until it installs its own program data and until two other hardware tiles (A and B) receive and install their respective program data. Therefore, the predefined period of time associated with the kickoff state counter on tile C may be, e.g., a function of the time needed to transmit program data to and install the program data on tiles A and B, as well as the time to install program data on tile C. Referring to FIG. 3, this may occur, e.g., at a time equivalent to the difference between when all the hardware tiles kick off (at t6) and when the last hardware tile C receives a data program packet intended to be installed on tile C (at t3), i.e., at a time of t6–t3.

Similarly, once hardware tile B receives its program data, tile B waits until it installs its own program data and until one other hardware tile (tile A) receives and installs its respective program data. Therefore, the predefined period of time associated with the kickoff state counter on tile B may be, e.g., a function of the time to transmit program data to and install the program data on tile A, as well as the time to install program data on tile B. Referring to FIG. 3, this may occur, e.g., at a time equivalent to the difference between when all the hardware tiles kick off (at t6) and when the hardware tile B receives a data program packet intended to be installed on tile B (at t4), i.e., at a time of t6–t4.

Similarly, once hardware tile A receives its program data, tile A waits until it installs its own program data before it can kickoff execution of the program data. Therefore, the predefined period of time associated with the kickoff state counter on tile A may be, e.g., a function of the time needed to install the program data on tile A. Referring to FIG. 3, this may occur, e.g., at a time equivalent to the difference between when all the hardware tiles kick off (at t6) and when the hardware tile A receives a data program packet intended to be installed on tile A (at t5), i.e., at a time of t6–t5.

The specific times associated with each kickoff state counter may be calculated in advance and included in the program data provided with each program data packet. As explained herein, the different specific times associated with each kickoff state counter may be calculated and defined so that all tiles execute their installed/initialized programs simultaneously. In some implementations, each tile within the array may be configured to include a corresponding kickoff state counter. For instance, each of tiles A, B, and C may be configured to include a corresponding kickoff state counter having a different predefined period of time to wait to execute its stored program data.

In some implementations, at least some of the tiles within the array may be configured to include a corresponding kickoff state counter. For example, if there are N tiles in the array, then N−1 tiles may be configured to include a corresponding kickoff state counter. This may include configuring all of the tiles in an array, except for a first tile of the array, to include a corresponding kickoff state counter. Using the example of the present application, each of tiles B and C may be configured to include a corresponding kickoff state counter having a different predefined period of time to wait to execute its stored program data. But tile A may not be configured to have a corresponding kickoff state counter. In this case, tiles B and C may wait until their kickoff state counters are triggered to execute their received program data, but tile A, upon receiving program data, may execute the program data immediately so that each of tile A, B, and C execute their respective program data simultaneously.

As explained herein, the chip described herein is unlike traditional processors in which instructions are issued at every cycle and contain source and destination registers for various configurations of the chip's functional units. Instead, each hardware tile on the chip is controlled by a logical set of states known as the configuration state. The configuration state describes whether the hardware tile is configured to forward data, store data in memory, install data, or execute a program, among other functions. Depending on the particular state in which a hardware tile is configured, the state will specify the control signals for various multiplexers in the hardware tile, as well as the read and write operations for memory and registers within the hardware tiles. The configuration state of a hardware tile is updated (e.g., switched to a forwarding state or other state) through a trigger table.

Figure 4:
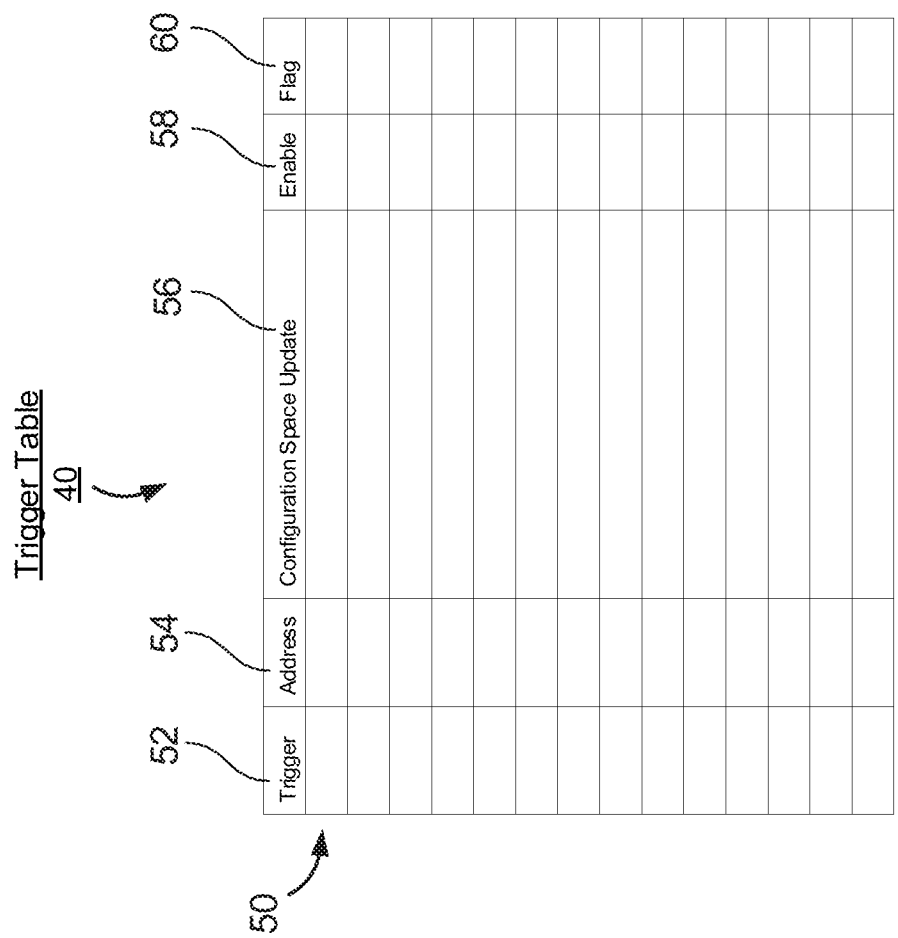
FIG. 4 is a schematic that illustrates an example of a trigger table.

FIG. 4 is a schematic that illustrates an example of a trigger table 40. The trigger table 40 is an addressable set of configuration state updates, each of which gets applied when a specific condition is met. For instance, upon installing a forwarding state counter within a hardware tile as described herein, a condition and associated configuration may be added to the trigger table 40. When the forwarding state counter counts down to 0 (or up to the predefined period of time), the condition that has been added to the table 40 is met, so a trigger fires and the configuration associated with that condition is applied to the hardware tile. The kickoff state counter may be implemented in a similar manner.

The trigger table 40 includes multiple entries 50. Each entry 50 may include, e.g., a trigger ID 52, an address 54, a configuration space update 56, and enable flag 58, and one or more additional flags 60. The trigger ID 52 describes the trigger type and acts as a pointer to any associated state. The combination of the address 54 and the configuration space update 56 describe how to update the configuration state of the hardware tile. The enable flag 58 specifies whether the trigger is currently active and may fire at any time. The additional flag 60 may specify other aspects relates to the trigger such as whether or not the trigger fired within the last clock cycle. The trigger table 40 may include multiple numbers of entries including, e.g., 8, 16, 32, or 64 entries. The trigger table 40 may be realized by locally storing the different configuration states of the trigger table 40 in memory and selecting the states using one or more multiplexers within the hardware tile.

Particular implementations of modifying the configuration state of tiles have been described. However, other implementations are also possible. For example, in some implementations, rather than create a forwarding path followed by loading program data to the tiles sequentially as described herein, program data may be installed a tile simultaneously with configuring the tile to be in a forwarding state and with installing a kickoff state counter to start the program within the tile. Using the tile structure shown in FIG. 1, for example, an alternative or additional exemplary process for loading program data will be described. For instance, in some implementations, the communication interface 12 sends, to a first tile (e.g., tile A), a first data packet containing configuration data (e.g., as a header of the data packet) and program data (e.g., as the payload of the data packet). The configuration data, when read by tile A, causes tile A to store the program data from the data packet in local memory and/or configure the logic circuits to perform a predefined set of operations. Additionally, the configuration packet may configure tile A to be placed in a forwarding state while simultaneously initializing a kickoff state counter. As explained herein, a kickoff state counter may be a counter that counts a predetermined time until a tile is caused to change its configuration state so that a program installed on the tile begins running (i.e., "kicks off"). The length of time that kickoff state counter in tile A counts is dependent on the amount of data needed for tiles that follow tile A rather than the amount of data needed for tiles that occur before tile A. For instance, if there are two tiles following tile A, then the value of kickoff state counter in tile A is determined based on the time it takes to forward configuration and program data to the next two tiles.

Additionally, it is noted that to configure a tile to install the program data while simultaneously placing the tile in a forwarding state may include setting up a separate timer for the forwarding state that is set to 0 clock cycles.

Once the first tile is in the forwarding state, the communication interface 12 sends a second data packet out. This second data packet may pass through the first tile in a forwarding state and arrive at a second tile (e.g., tile B) in an array. The second data packet is similar to the first data packet. For instance, the second data packet contains configuration data (e.g., as a header of the second data packet) and program data (e.g., as the payload of the second data packet). The configuration data, when read by the second causes the second tile to store the program data from the second data packet in local memory and/or configure the logic circuits to perform a predefined set of operations. Additionally, the configuration packet may configure the second tile to be placed in a forwarding state while simultaneously initializing a kickoff state counter. The value of the kickoff state counter in the second tile is determined by the amount of data to be forwarded and configured by the remaining tiles after the second tile in an array.

In this implementation, each tile in a pathway is configured in the same way as the first and second tile except for a last tile (e.g., tile C) in the pathway. For the last tile, the communication interface 12 sends a last data packet. The last data packet includes configuration data and program data. In contrast to the previous data packets, the last tile is not configured to be in a forwarding state. Instead, the last tile is configured to install the program data and to begin executing operations using the program data once installation is complete. At the same time, the kickoff state counters for each previous tile in the pathway (e.g., tiles A and B) reach their limit and cause their respective tiles to begin executing operations using the program data saved locally to their tiles. In this way, the tiles may be said to be programmed directly by the communication interface, where the forwarding path is set up as the program data is installed on a tile and a kickoff state counter is initialized, as opposed to being programmed indirectly by first setting up a forwarding path, and then sending the program data for each tile down after the forwarding path has been established, as also described herein.

Figure 5:
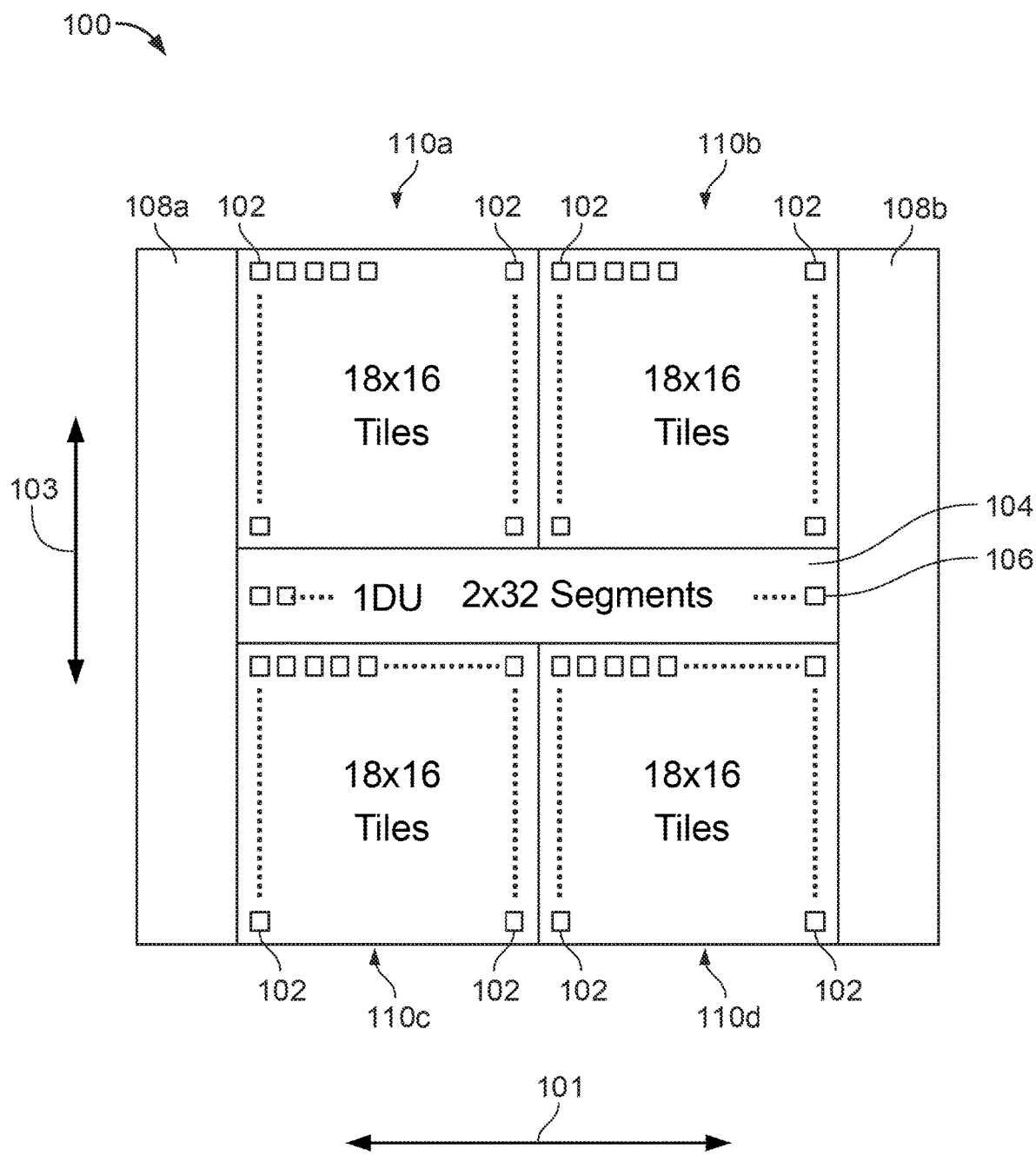
FIG. 5 is a schematic that illustrates an example of special purpose logic circuitry that can be configured to operate according to scheduled operations.

FIG. 5 is a schematic that illustrates an example of special purpose logic circuitry that can be configured to operate according to scheduled operations and can be initialized as described herein. For instance, the special logic circuitry may include an ASIC 100. The ASIC 100 includes various different types of hardware blocks that can be configured to execute operations the overall operations of the ASIC 100 according to individual operation schedules. Example hardware blocks that can operate according to individual operation schedules include tiles 102 and vector processing unit 104 (similar to hardware tiles 14 I FIG. 1) and communication interface 108 (similar to communication interface 12 in FIG. 1).

More specifically, the ASIC 100 includes multiple tiles 102, in which one or more of the tiles 102 includes special purpose circuitry configured to perform operations, such as e.g., multiplication and addition operations. In particular, each tile 102 can include a computational array of cells (e.g., similar to the computational units 22 of FIG. 1), in which each cell is configured to perform mathematical operations (see, e.g., the exemplary tile 200 shown in FIG. 6, and described herein). In some implementations, the tiles 102 are arranged in a grid pattern, with tiles 102 arranged along a first dimension 101 (e.g., rows) and along a second dimension 103 (e.g., columns). For instance, in the example shown in FIG. 5, the tiles 102 are divided into four different sections (110a, 110b, 110c, 110d), each section containing 288 tiles arranged in a grid of 18 tiles down by 16 tiles across. In some implementations, the ASIC 100 shown in FIG. 5 may be understood as including a single systolic array of cells subdivided/arranged into separate tiles, in which each tile includes a subset/sub-array of cells, local memory and bus lines (see, e.g., FIG. 6).

The ASIC 100 also includes a vector processing unit 104. The vector processing unit 104 includes circuitry configured to receive outputs from the tiles 102 and compute vector computation output values based on the outputs received from the tiles 102. For example, in some implementations, the vector processing unit 104 includes circuitry (e.g., multiply circuitry, adder circuitry, shifters, and/or memory) configured to perform accumulation operations on the outputs received from the tiles 102. Alternatively, or in addition, the vector processing unit 104 includes circuitry configured to apply a non-linear function to the outputs of the tiles 102. Alternatively, or in addition, the vector processing unit 104 generates normalized values, pooled values, or both. The vector computation outputs of the vector processing units can be stored in one or more tiles. For example, the vector computation outputs can be stored in memory uniquely associated with a tile 102. Alternatively, or in addition, the vector computation outputs of the vector processing unit 104 can be transferred to a circuit external to the ASIC 100, e.g., as an output of a computation. Furthermore, the operations of the individual operation schedules for the tiles 102 and the vector processing unit 104 coordinate the transfer of the tile outputs to the vector processing unit 104.

In some implementations, the vector processing unit 104 is segmented, such that each segment includes circuitry configured to receive outputs from a corresponding collection of tiles 102 and computes vector computation outputs based on the received outputs. For instance, in the example shown in FIG. 5, the vector processing unit 104 includes two rows spanning along the first dimension 101, each of the rows including 32 segments 106 arranged in 32 columns. Each segment 106 includes circuitry (e.g., multiply circuitry, adder circuitry, shifters, and/or memory) configured to perform a vector computation, as explained herein, based on outputs (e.g., an accumulated sum) from a corresponding column of tiles 102. The vector processing unit 104 can be positioned in the middle of the grid of tiles 102 as shown in FIG. 5. Other positional arrangements of the vector processing unit 104 are also possible.

The ASIC 100 also includes a communication interface 108 (e.g., interfaces 1010A, 1010B). The communication interface 108 includes one or more sets of serializer/deserializer (SerDes) interfaces and a general purpose input/output (GPIO) interface. The SerDes interface is configured to receive instructions (e.g., operation schedules for the individual hardware blocks of the ASIC 100) and/or input data for the ASIC 100 and to output data from the ASIC 100 to an external circuit. For example, the SerDes interface can be configured to transmit and receive data (e.g., operation schedules and/or input/output data) at a rate of 32 Gbps, 56 Gbps, or any suitable data rate over the set of SerDes interfaces included within the communications interface 108. For example, the ASIC 100 may run a boot program when it is turned on. The GPIO interface may be used to load operation schedules onto the ASIC 100 for executing a particular type of machine learning model.

The ASIC 100 further includes multiple controllable bus lines (see, e.g., FIG. 6) configured to convey data among the communications interface 108, the vector processing unit 104, and the multiple tiles 102. Controllable bus lines include, e.g., wires that extend along both the first dimension 101 (e.g., rows) of the grid and the second dimension 103 (e.g., columns) of the grid. A first subset of the controllable bus lines extending along the first dimension 101 can be configured to transfer data in a first direction (e.g., to the right of FIG. 5). A second subset of the controllable bus lines extending along the first dimension 101 can be configured to transfer data in a second direction (e.g., to the left of FIG. 5). A first subset of the controllable bus lines extending along the second dimension 103 can be configured to transfer data in a third direction (e.g. to the top of FIG. 5). A second subset of the controllable bus lines extending along the second dimension 103 can be configured to transfer data in a fourth direction (e.g., to the bottom of FIG. 5). As discussed above, the individual operation schedules of the different hardware blocks can coordinate access to shared resources such as the controllable bus lines to prevent communication errors within the ASIC 100.

Each controllable bus line includes multiple conveyer elements, such as flip-flops, that are used to convey data along the lines in accordance with a clock signal. Transferring data over a controllable bus line can include shifting, at each clock cycle, data from a first conveyer element of the controllable bus line to a second adjacent conveyer element of the controllable bus line. In some implementations, data is conveyed over the controllable bus lines upon the rising or falling edge of a clock cycle. For example, data present, at a first clock cycle, on a first conveyer element (e.g., a flip-flop) of a controllable bus line can be transferred to a second conveyor element (e.g., a flip-flop) of the controllable bus line at a second clock cycle. In some implementations, the conveyer elements can be periodically spaced apart at a fixed distance from one another. For example, in some cases, each controllable bus line includes multiple conveyer elements, with each conveyer element positioned within or proximate to a corresponding tile 102.

Each controllable bus line also includes multiple multiplexers and/or demultiplexers. A multiplexer/demultiplexer of a controllable bus line is configured to transfer data between the bus line and a component of the ASIC chip 100. For example, a multiplexer/demultiplexer of a controllable bus line can be configured to transfer data to and/or from a tile 102, to and/or from the vector processing unit 104, or to and/or from the communication interface 108. Transferring data among tiles 102, the vector processing unit 104, and the communication interface can be coordinated by the operation schedules. The operation schedules can coordinate which ASIC 100 hardware blocks are transmitting to or receiving data from the controllable at each counter. The operations scheduled at any given counter time may determine, e.g., what data is transferred from a source (e.g., memory within a tile 102 or a vector processing unit 104) to a controllable bus line or, alternatively, what data is transferred from the controllable bus line to a sink (e.g., memory within a tile 102 or a vector processing unit 104).

The controllable bus lines are configured to be controlled on a local level, such that each tile, vector processing unit, and/or communication interface includes its own set of control elements for manipulating the controllable bus lines passing through that tile, vector processing unit, and/or communication interface. For example, each tile, 1D vector processing unit, and communication interface may include a corresponding set of conveyor elements, multiplexers and/or demultiplexers for controlling data transfer to and from that tile, 1D vector processing unit, and communication interface. Accordingly, the operation schedule for each tile, 1D vector processing unit, and communication interface can trigger the respective hardware block to provide appropriate control signals to the its conveyer elements in order to route data in accordance with the scheduled operations.

To minimize latency associated with operations of the ASIC chip 100, the tiles 102 and vector processing unit 104 can be positioned to reduce the distance data travels among the various components. In a particular implementation, both the tiles 102 and communication interface 108 can be segregated into multiple sections, with both the tile sections and the communication interface sections being arranged such that the maximum distance data travels between a tile and a communication interface is reduced. For instance, in some implementations, a first group of tiles 102 can be arranged in a first section on a first side of the communications interface 108, and a second group of tiles 102 can be arranged in a second section on a second side of the communication interface. As a result, the distance from a communication interface to the furthest tile may be cut in half compared to a configuration in which all of the tiles 102 are arranged in a single section on one side of the communication interface.

Alternatively, the tiles may be arranged in a different number of sections, such as four sections. For instance, in the example shown in FIG. 5, the multiple tiles 102 of ASIC 100 are arranged in multiple sections 110 (110*a*, 110*b*, 110*c*, 110*d*). Each section 110 includes a similar number of tiles 102 arranged in a grid pattern (e.g., each section 110 can include 256 tiles arranged in 16 rows and 16 columns). The communication interface 108 also is divided into multiple sections: a first communication interface 1010A and a second communication interface 1010B arranged on either side of the sections 110 of tiles 102. The first communication interface 1010A can be coupled, through controllable bus lines, to the two tile sections 110a, 110c on the left side of the ASIC chip 100. The second communication interface 1010B can be coupled, through controllable bus lines, to the two tile sections 110b, 110d on the right side of the ASIC chip 100. As a result, the maximum distance data travels (and thus the latency associated with the data propagation) to and/or from a communication interface 108 can be halved compared to an arrangement in which only a single communication interface is available. Other coupling arrangements of the tiles 102 and communication interfaces 108 are also possible to reduce data latency. The coupling arrangement of the tiles 102 and communication interface 108 can be programmed by providing control signals to the conveyer elements and multiplexers of the controllable bus lines.

In some implementations, one or more tiles 102 are configured to initiate reading and writing operations with respect to controllable bus lines and/or other tiles within the ASIC 100 (referred to herein as "control tiles"). The remaining tiles within the ASIC 100 can be configured to perform computations based on the input data (e.g., to compute layer inferences). In some implementations, the control tiles include the same components and configuration as the other tiles within the ASIC 100. The control tiles can be added as an extra tile or tiles, an extra row or rows, or an extra column or columns of the ASIC 100. For example, for a symmetric grid of tiles 102, in which each tile 102 is configured to perform a computation on input data, one or more additional rows of control tiles can be included to handle reading and writing operations for the tiles 102 performing computations on the input data. For instance, each section 110 includes 18 rows of tiles, where the last two rows of tiles may include control tiles. Providing separate control tiles increases, in some implementations, the amount of memory available in the other tiles used to perform the computations. Providing separate control tiles also may aid in coordination of data transmission operations between operation schedules. For example, using control tiles to control reading and writing operations with respect to controllable bus lines and/or other tiles within the ASIC 100 may reduce the number of individual schedules that need to be checked for scheduling conflicts. In other words, if the operation schedules for the control tiles are coordinated to avoid "double booking" the use of a particular controllable bus line at the same counter time, then there is a reasonable assurance that communications errors will not occur on the controllable bus lines. Separate tiles dedicated to providing control as described herein are not necessary, however, and in some cases, no separate control tiles are provided. Rather, each tile may store in its local memory instructions for initiating reading and writing operations for that tile.

Furthermore, while each section 110 shown in FIG. 5 includes tiles arranged in 18 rows by 16 columns, the number of tiles 102 and their arrangement in a section can be different. For example, in some cases, the sections 110 may include an equal number of rows and columns.

Furthermore, although shown in FIG. 5 as divided into four sections, the tiles 102 can be divided into other different groupings. For example, in some implementations, the tiles 102 are grouped into two different sections, such as a first section above the vector processing unit 104 (e.g., nearer the top of the page shown in FIG. 5) and a second section below the vector processing unit 104 (e.g., nearer to the bottom of the page shown in FIG. 5). In such an arrangement, each section may contain, e.g., 596 tiles arranged in a grid of 18 tiles down (along direction 103) by 32 tiles across (along direction 101). Sections may contain other total numbers of tiles and may be arranged in different sized arrays. In some cases, the divisions between sections are delineated by hardware features of the ASIC 100. For example, as shown in FIG. 5, sections 110a, 110b may be separated from sections 110c, 110d by the vector processing unit 104.

Figure 6:
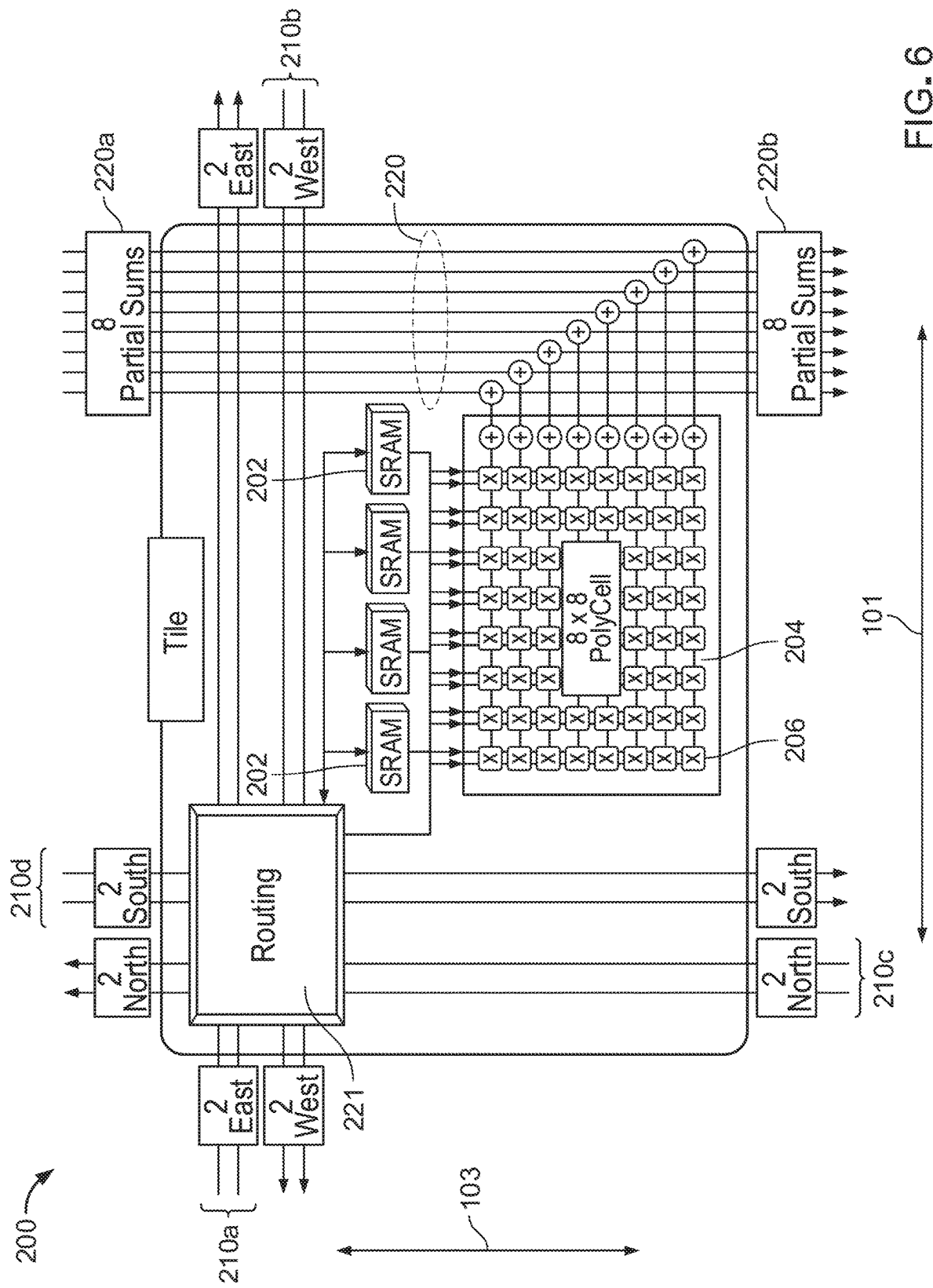
FIG. 6 is a schematic that illustrates an example of a tile for use in the ASIC chip of FIG. 5.

A schematic illustrating an example of a tile 200 for use in the ASIC chip 100 is shown in FIG. 6. Each tile 200 includes local memory 202 and a computational array 204 coupled to the memory 202. The local memory 202 includes physical memory positioned proximate to the computational array 204. The computational array 204 includes multiple cells 206. Each cell 206 of the computational array 204 includes circuitry configured to perform a computation (e.g., a multiply and accumulate operation) based on data inputs, such as activation inputs and weight inputs, to the cell 206. Each cell can perform the computation (e.g., the multiply and accumulation operation) on a cycle of the clock signal. The computational array 204 can have more rows than columns, more columns than rows, or an equal number of columns and rows. For instance, in the example shown in FIG. 6, the computational array 204 includes 64 cells arranged in 8 rows and 8 columns. Other computational array sizes are also possible, such as computational arrays having 16 cells, 32 cells, 128 cells, or 256 cells, among others. Each tile can include the same number of cells and/or the same size computational array. The total number of operations that can be performed in parallel for the ASIC chip then depends on the total number of tiles having the same size computational array within the chip. For example, for the ASIC chip 100 shown in FIG. 5, which contains approximately 1150 tiles, this means that approximately 92,000 computations can be performed in parallel every cycle. Examples of clock speeds that may be used include, but are not limited to, 225 MHz, 500 MHz, 950 MHz, 1 GHz, 1.25 GHz, 1.5 GHz, 1.95 GHz, or 2 GHz. The computational arrays 204 of each individual tile is a subset of the larger systolic array of tiles, as illustrated in FIG. 5.

The memory 202 contained in the tile 200 can include, e.g., random-access memory (RAM), such as SRAM. Other memory can be used instead. Each memory 202 can be configured to store $(1/n)^{th}$ of the total memory associated with n tiles 102 of the ASIC chip. The memory 202 can provided as a single chip or in multiple chips. For example, memory 202 shown in FIG. 6 is provided as four single-port SRAMs, each of which is coupled to the computational array 204. Alternatively, the memory 202 can be provided as two single-port SRAMs or eight single-port SRAMS, among other configurations. The joint capacity of the memory can be, but is not limited to, e.g., 16 kB, 32 kB, 64 kB, or 128 kB, after error correction coding. By providing the physical memory 202 locally to the computational arrays, the density of wiring for the ASIC 100 can be, in some implementations, vastly reduced. In an alternate configuration in which memory is centralized within the ASIC 100, as opposed to provided locally as described herein, may require a wire for each bit of memory bandwidth. The total number of wires needed to cover each tile of the ASIC 100 would far exceed the available space within the ASIC 100. In contrast, with dedicated memory provided for each tile, the total number of required to span the area of the ASIC 100 can be substantially reduced.

The tile 200 also includes controllable bus lines. The controllable bus lines may be categorized into multiple different groups. For example, the controllable bus lines can include a first group of general purpose controllable bus lines 210 configured to transfer data among tiles in each cardinal direction. That is, the first group of controllable bus lines 210 can include: bus lines 210a configured to transfer data toward a first direction along the first dimension 101 of the grid of tiles (referred to as "East" in FIG. 6); bus lines 210b configured to transfer data toward a second direction along the first dimension 101 of the grid of tiles (referred to as "West" in FIG. 6), in which the second direction is opposite to that of the first direction; bus lines 210c configured to transfer data toward a third direction along the second dimension 103 of the grid of tiles (referred to as "North" in FIG. 6); and bus lines 210d configured to transfer data toward a fourth direction along the second dimension 103 of the grid of tiles (referred to as "South" in FIG. 6), in which the fourth direction is opposite to the third direction. General purpose bus lines 210 can be configured to carry control data, activation input data, data from and/or to the communications interface, data from and/or to the vector processing unit, and data to be stored and/or used by the tile 200 (e.g., weight inputs). The tile 200 may include one or more control elements 221 (e.g., flip-flops and multiplexers) for controlling the controllable bus lines, and thus routing data to and/or from the tile 200 and/or from memory 202.

The controllable bus lines also can include a second group of controllable bus lines, referred to herein as computational array partial sum bus lines 220. The computational array partial sum bus lines 220 can be configured to carry data output from computations performed by the computational array 204. For example, the bus lines 220 can be configured to carry partial sum data obtained from the rows in the computational array 204, as shown in FIG. 6. In such case, the number of bus lines 220 would match the number of rows in the array 204. For instance, for a 8×8 computational array, there would be 8 partial sum bus lines 220, each of which is coupled to the output of a corresponding row in the computational array 204. The computational array output bus lines 220 can be further configured to couple to another tile within the ASIC chip, e.g., as inputs to a computational array of another tile within the ASIC chip. For example, the array partial sum bus lines 220 of tile 200 can be configured to receive inputs (e.g., partial sums 220a) of a computational array of a second tile that is located at least one tile away from the tile 200. The outputs of computational array 204 then are added to the partial sum lines 220 to produce new partial sums 220b, which may be output from the tile 200. The partial sums 220b then may be passed to another tile or, alternatively, to the vector processing unit. For example, each bus line 220 may be coupled to a corresponding segment (such as segments 106 in FIG. 5) of the vector processing unit.

As explained with respect to FIG. 5, the controllable bus lines can include circuitry such as conveyer elements (e.g., flip-flops) configured to allow data to be conveyed along the bus lines. In some implementations, each controllable bus line includes, for each tile, a corresponding conveyer element. As further explained with respect to FIG. 5, the controllable bus lines can include circuitry such as multiplexers configured to allow data to be transferred among the different tiles, the vector processing unit and the communications interface of the ASIC chip. The multiplexers can be located wherever there is a source or sink for data. For example, in some implementations, as shown in FIG. 6, control circuitry 221, such as multiplexers, can be located at crossings of controllable bus line (e.g., at the crossing of general purpose bus lines 210a and 210d, at the crossing of general purpose bus lines 210a and 210c, at the crossing of general purpose bus lines 210b and 210d, and/or at the crossing of general purpose bus lines 210b and 210c). The multiplexers at the bus line crossings can be configured to transfer data between the bus lines at the crossings. Control circuitry 221 can execute the operations of the operation schedule by routing data to appropriate components within the tile 102 (e.g., routing activation data or layer weights to/from SRAM 202 to appropriate cells 206 in the computational array 204) or routing output data and input data to/from the controllable bus lines.

FIGS. 7A-13B are schematics that illustrate an example process in which the ASIC 100 is used as a hardware accelerator for computing neural network inferences. FIGS. 7A, 8A, 9A, 10A, 11, 12A and 13A are schematics that illustrate an overview of data flow through the ASIC 100 at different times in the process. FIGS. 7B, 8B, 9B, 10B, 12B and 13B are schematics that illustrate data flow within a single tile (e.g., a control tile or other tile 102) of the ASIC 100 at the times associated with FIGS. 7A, 8A, 9A, 10A, 12A and 13A, respectively. The ellipses in FIGS. 7A-13B indicate the presence of repeating features that are not shown in the figures. A compass 300 is provided in each of FIGS. 7A-13B to provide orientation for data flow. The labels "N," "W," "S" and "E" do not correspond to actual geographic directions, but instead are used to indicate different relative directions in which data can flow through the grid. Controllable bus lines conveying data in the directions indicated by the labels "N," "W," "S" and "E" are referred to herein as north-flowing bus lines, west-flowing bus lines, south-flowing bus lines, and east-flowing bus lines.

The arrangement of tiles 102 and vector processing unit 104 in FIGS. 7A-13A is similar to the arrangement shown in FIG. 5. For example, half of the tiles 102 can be arranged on a first side of the vector processing unit 104 and the other half of tiles 102 can be arranged on a second opposite side of the vector processing unit 104. The communication interfaces 108 are shown in FIGS. 7A-13A as arranged on entirely on the right side of the tile grid, but can be positioned on either side of the tile grid as depicted in the schematic of FIG. 5.

Figures 7A, 7B:
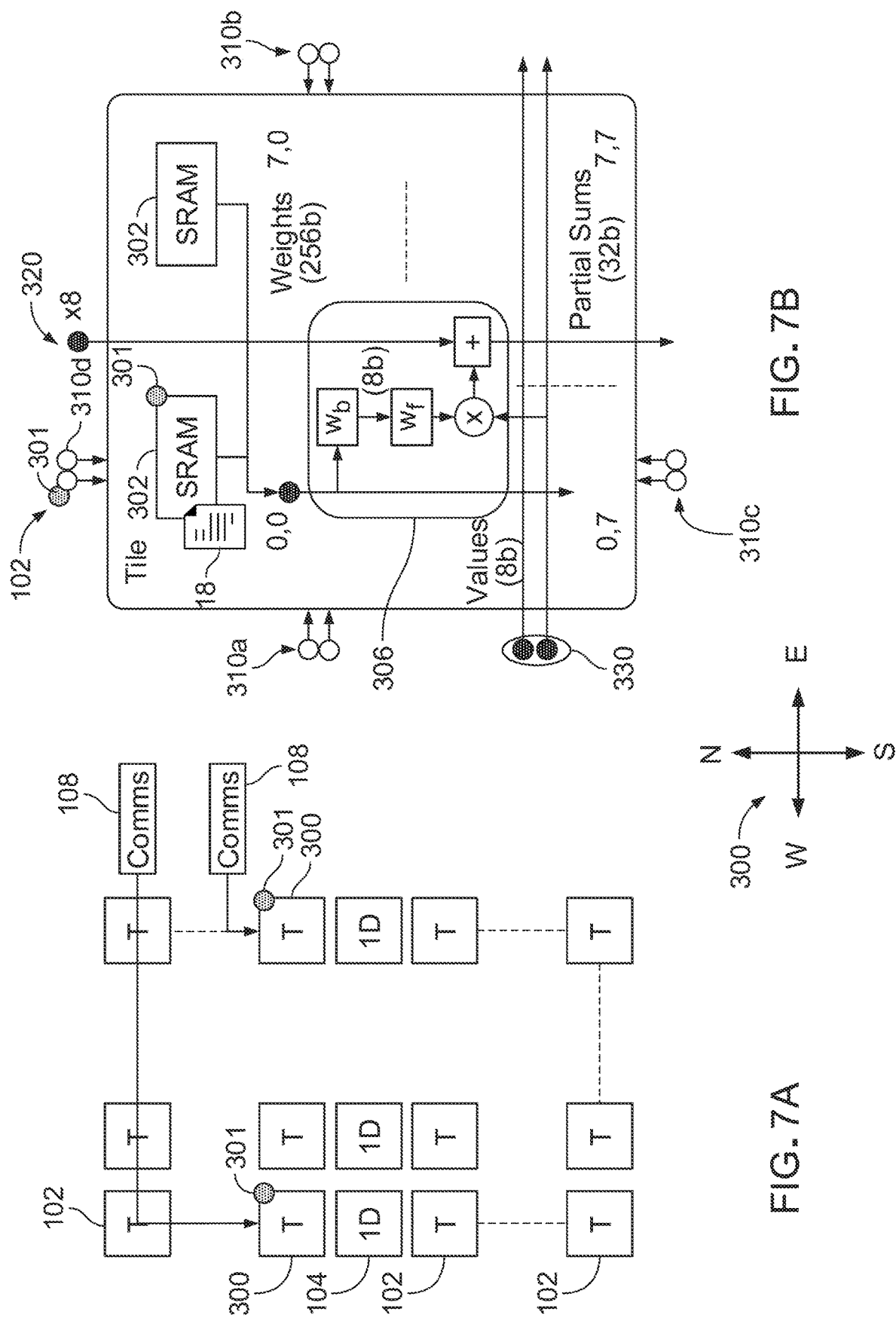

In a first step, as shown in FIG. 7A, input values (e.g., activation inputs and/or weight inputs) for a first layer of a model (e.g., a neural network model) are loaded from the communication interfaces 108 onto one or more tiles 102 (e.g., all of the tiles 102) within the ASIC 100. That is, data such as configuration data packets or program operation packets as described herein with respect to FIGS. 1-3 are received from the communication interfaces 108. From the communications interfaces 108, the input values follow a data path along the controllable bus lines (e.g., such as the general purpose controllable bus lines described herein) to the one or more control tiles. The data can be transferred between different bus lines through the use of multiplexers at locations where the different bus lines cross (e.g., see routing element 221 in FIG. 6). For example, as shown in FIG. 7A, the input data flows along a data path that entails traveling on west-flowing general purpose controllable bus lines and then on south-flowing general purpose controllable bus lines. The input data can be transferred from the west-flowing bus lines to the south-flowing bus lines through the use of multiplexers at locations where the west-flowing bus lines and south-flowing bus lines cross. In some implementations, the weight inputs for a second inference can be loaded to the one or more control tiles while a previous first inference is being executed by the ASIC 100. In other words, the operation schedules of the control tiles are coordinated with those of the other tiles 102 that are computing the inference, such that at the same counter times that the other tiles 102 are computing a first inference, the control tiles 102 are preparing new activation data and/or weights for the next inference to be sent to the other tiles 102 for computation of the next inference.

FIG. 7B is a schematic that illustrates a detailed view of an example of a tile 102, from the ASIC 100. As shown in FIG. 7B, the tile 102 can include memory 302 on which the input values are stored. Memory 302 can include any suitable memory as described herein with respect to FIG. 6. As discussed above, the memory 302 can be used to store configuration state data (e.g., from configuration data packets) or program data such as the tile's individual operation schedule. The input values are obtained from one or more south-flowing general purpose controllable bus lines 310d that pass adjacent to or through the tile 102. The data from the south-flowing controllable bus lines 310d can be transferred to the memory 302 through the use of a multiplexer. Other general purpose controllable bus lines (310a, 310b, 310c) are not used during this step.

Tile 102 also includes a computational array of cells 306 directly coupled to memory 302. As explained herein, the computational array of cells 306 may be a subset of a larger systolic array of cells that makes up the tiles of the ASIC. The cells 306 are arranged in an array, with a single cell 306 shown in FIG. 7B at a position (i, j)=(0, 0), where the parameter i represents a cell row position within the array and j represents a cell column position in the array. In the example shown in FIG. 7B, the computational array has 8 rows and 8 columns, though other sizes also are possible. Each cell 306 of the computational array can include circuitry configured to perform computations based on data received at the tile. For example, each cell 306 can include multiplier circuitry, adder circuitry, and one or more registers. The output of each cell 306 can be passed as a partial sum to an adjacent cell within the computational array or to a cell within a computational array of another tile in the ASIC 100. The computational array of cells 306 is used in later steps.

The tile 102 also includes controllable bus lines 320 for providing data from previous tiles. For example, the controllable bus lines 320 can carry partial sum output data obtained from a computational array of a previous tile in the ASIC 100 and provide the partial sum output data as an input to the cells of the computational array within tile 102. Controllable bus lines 320 are not used in this step.

The tile 102 also includes controllable bus lines 330 for providing activation input values as an input to the cells 306 of the computational array. For example, the activation input values can be provided to multiplier circuitry within the cell 306. The activation input values can be obtained from the communications interface 108 or from cells within another tile in the ASIC 100. The data from the controllable bus lines 330 can be transferred to the cells 306 through the use of a multiplexer. Controllable bus lines 330 are not used in the example step depicted in FIGS. 7A-7B.

As explained herein, in some implementations, one or more tiles 102 are dedicated to storing program data, such as operation schedules, and/or output information from the vector processing unit 104. In some implementations, the computational arrays within the one or more control tiles may not be used to perform computations. Alternatively, the one or more control tiles can be configured to store program data, such as operation schedules, in addition to performing computations on input data, such as received weight inputs and activation values. In some implementations, the weight inputs are loaded into the memory of each tile 102 where the weight inputs will be used, without first storing the weight inputs in a subset of one or more control tiles.

Figures 8A, 8B:
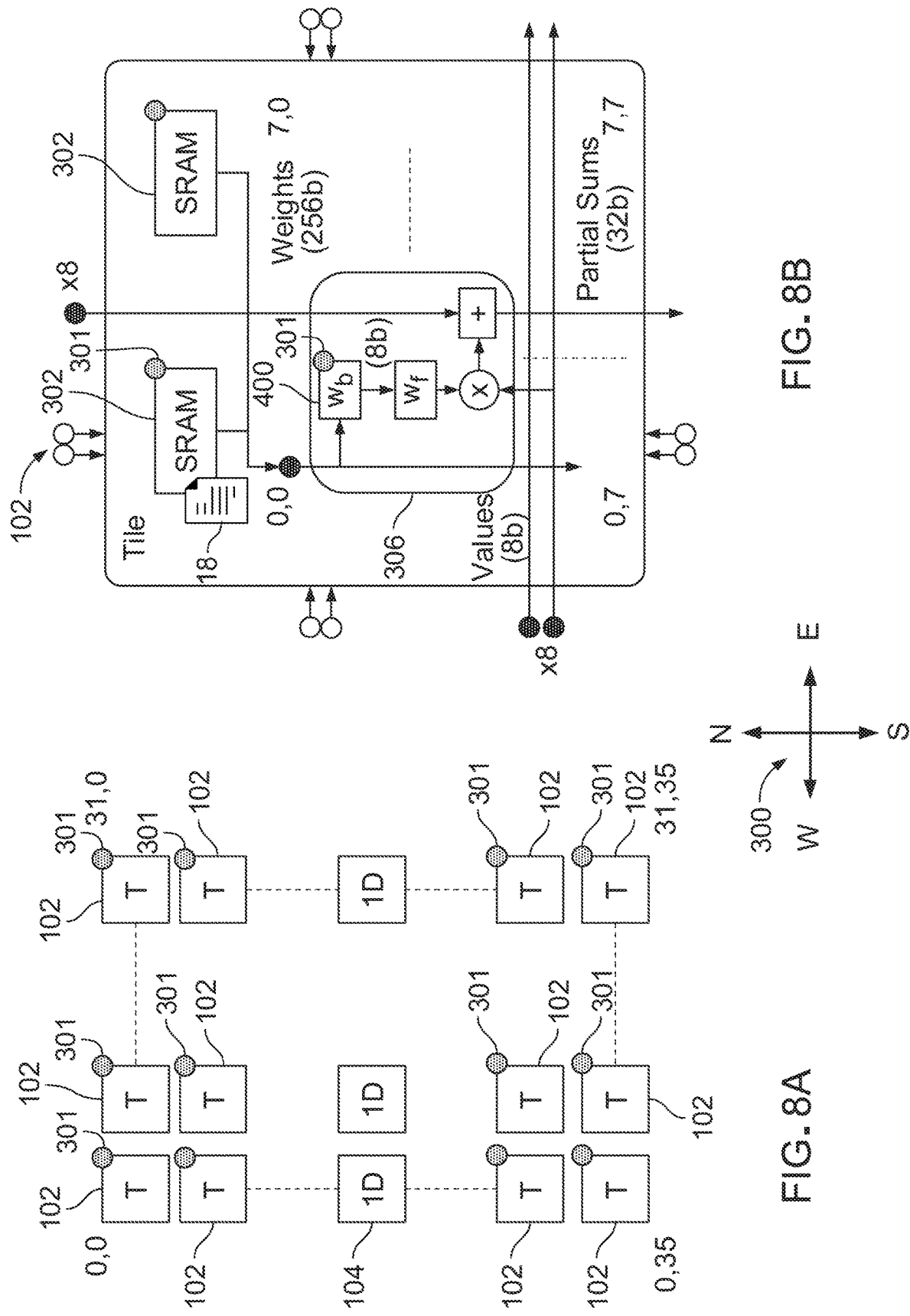

In a second step, as shown in FIG. 8A, at the scheduled counter value, weight inputs 301 are loaded into the individual cells 306 of the computational arrays within the tiles 102. Loading the weight inputs 301 into the individual cells 306 can include transferring the data from the memory of one or more control tiles to the corresponding tiles 102 in which the weight inputs 301 belong. The weight inputs 301 can be conveyed along the general purpose controllable bus lines to the tiles 102 and transferred to the memory through multiplexers coupled to the bus lines and memory. FIG. 8B is a detailed view of an example of a tile 102. The weight inputs 301 can be stored in the memory 302 for the duration of the model execution, which may include computation of multiple inferences. As an alternative to loading the weight inputs 301 from the one or more control tiles, the weight inputs 301 may have been pre-loaded into the memory of tiles 102 directly from the communication interfaces 108. To prepare a model for execution, the weight inputs 301, for each tile 102, can be loaded from the memory 302 of the tile 102 into each cell 306 of the computational array within that tile 102. For example, the weight inputs 301 can be loaded into a register 400 (also referred to as a "back register") within the cell 306. The use of back registers allows a computation to be performed by the cell 306 on a current weight input while a next weight input is loaded into the back register. Although loading weight registers is shown for only one cell 306 in FIG. 8B, weight registers of other cells within the computational array also can be loaded during this step.

In a third step, as shown in FIG. 9A, at the scheduled counter value, activation values 500 are introduced into the tiles 102 and may be stored within memory 302 there. The activation values 500 can be transferred over multiple clock cycles. Computations then are performed by the computational arrays of each tile 102 with the received activation values 500 and the weight inputs 301 from the memory 302 in the tile 102. For example, the computation can include multiplying an activation value by a weight input and then summing the result with the product of a different weight input and activation value. In some implementations, the activation values 500 are conveyed to and between tiles 102 on controllable bus lines 330. Each of the controllable bus lines 330 can extend along a same direction. For example, as shown in FIG. 9B, the controllable bus lines 330 extend laterally along a grid dimension that is orthogonal to a grid dimension along which controllable bus lines 320 extend. Furthermore, as indicated by the arrows 501 in FIG. 9A, and the arrows 501 on controllable bus lines 330 in FIG. 9B, the activation input data 500 travels on the bus lines 330 in the same (e.g., east-flowing) direction. Alternatively, in some implementations, some of the activation input values 500 travel on some of the controllable bus lines 330 in a first direction (e.g., east-flowing direction) and some other activation input values 500 travel on some other controllable bus lines 330 in a second opposite direction (e.g., west-flowing direction).

In some implementations, the number of controllable bus lines 330 that extend through each tile 102 is determined by the size of the computational array. For example, the number of controllable bus lines 330 that extend through each tile 102 may be equal to at least the number of rows of cells within the computational array. In the example shown in FIG. 9B, there are 8 controllable bus lines 330 that pass through tile 102 given that there are 8 rows of cells 306 within the computational array of tile 102. In some implementations, each separate controllable bus line 330 transfers activation input values 500 to the cells 306 within a corresponding row of the computational array. For instance, for an 8×8 computational array of cells 306 within a tile 102, a first controllable bus line 330 transfers activation input values 500 to the cells 306 within a first row of the array, a second controllable bus line 330 transfers activation input values 500 to the cells 306 within a second row of the array, etc., up to the last controllable bus line 330, which transfers activation input values 500 to the cells 306 within the last row of the array. Additional controllable bus lines (e.g., partial sum bus lines) may pass through each tile to provide partial sums from another tile, to receive and combine results of computations within the tile to the provided partial sums, and to output the new partial sums to a new tile or to the vector processing unit.

In some implementations, the controllable bus lines 330 transfer the activation input values 500 to circuitry configured to perform a computation within the cell 306. For example, as shown in FIG. 9B, the controllable bus lines 330 are configured to transfer activation input values 500 to multiplier circuit 502 within the cell 306. The activation input values 500 can be transferred to the multiplier circuit 502 through the use of multiplexers on the controllable bus lines 330.

In some implementations, once the activation input values 500 and weight input values 301 are determined to be in place (e.g., after the predetermined number of counter cycles required to perform the loading operations), the cells 306 of the computational array within the tile 102 perform a computation using the received activation input values 500 and the weight input values 301 from the memory 302 in the tile 102. For example, as shown in FIG. 9B, the weight input values 301 that were previously stored in register 400 are transferred to register 504 (also referred to as a "front register"). Then, using the multiplier circuit 502, the weight input values 301 are multiplied with the received activation input values 500.

As explained herein, the activation input values 500 are conveyed on controllable bus lines 330. In some implementations, the controllable bus lines 330 are general purpose controllable bus lines. In some implementations, the controllable bus lines 330 can be dedicated to providing activation inputs. For example, as shown in FIG. 9B, activation input values can be provided to a tile 102 (e.g., to the cells 306 of a computational array within the tile 102) by lines 330, whereas other general purpose controllable bus lines 310b can be used to provide other data and/or instructions to the tile 102.

Figures 10A, 10B:
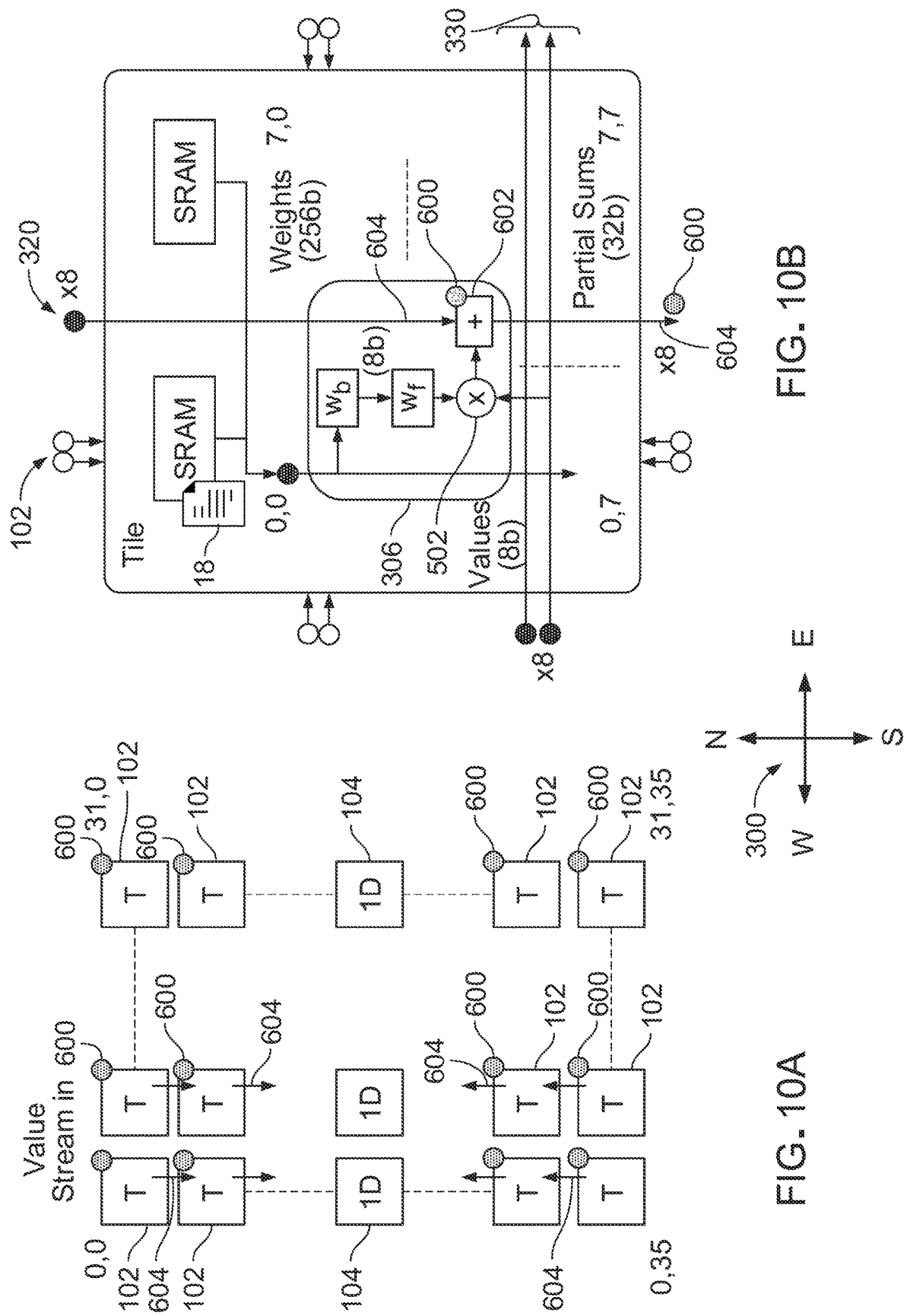

In a fourth step, as shown in FIG. 10B, at the scheduled counter value, a result of a computation between the weight input values 301 and the activation input values 500, within each cell 306, is passed to circuitry 602 within the cell 306 to produce an output value 600. In the example of FIG. 10B, the circuitry 602 includes a summation circuit. The summation circuit 602 within each cell 306 is configured to sum the product of the multiplier circuit 502 with another value obtained from either another tile 102 in the ASIC 100 or from another cell 306 within the computational array. The value obtained from another tile 102 or from another cell 306 can include, e.g., an accumulated value. Accordingly, the output value 600 of the summation circuit 602 is a new accumulated value. The summation circuit 602 then can send the new accumulated value 600 to another cell located in a bottom (e.g., in a south-flowing direction) adjacent cell of the computational array within the tile 102. The new accumulated value 600 can be used as an operand for a summation in the bottom adjacent cell. For the last row of cells within the computational array, the new accumulated values 600 can be transferred to another tile 102 within the ASIC 100, as shown in FIG. 10A. In another example, the new accumulated values 600 can be transferred to another tile 102 that is at least one tile away from the tile 102 in which the new accumulated values 600 were generated. Alternatively, as also shown in FIG. 10A, the new accumulated values 600 from the last row of cells within the computational array are transferred to the vector processing unit 104.

The accumulated values 600 that are transferred into a tile 102 or transferred out of a tile 102 can be conveyed along controllable bus lines 320. Each of the controllable bus lines 320 extend along a same direction. For example, as shown in FIG. 10B, the controllable bus lines 320 extend vertically along a grid dimension that is orthogonal to a grid dimension along which controllable bus lines 330 extend. Furthermore, as indicated by the arrows 604 in FIG. 10A, and the arrows 604 in FIG. 10B, the accumulated values 600 travel on the controllable bus lines 320 in either a north-flowing or south-flowing direction depending on the location of the vector processing unit 104 relative to the tiles 102 from which the accumulated values 600 are generated. For example, for the tiles 102 located above the vector processing unit 104 in FIG. 10A, the accumulated values 600 travel on the controllable bus lines 320 in a south-flowing direction towards the vector processing unit 104, whereas for the tiles 102 located below the vector processing unit 104, the accumulated values 600 travel in a north-flowing direction towards the vector processing unit 104.

Figure 11:
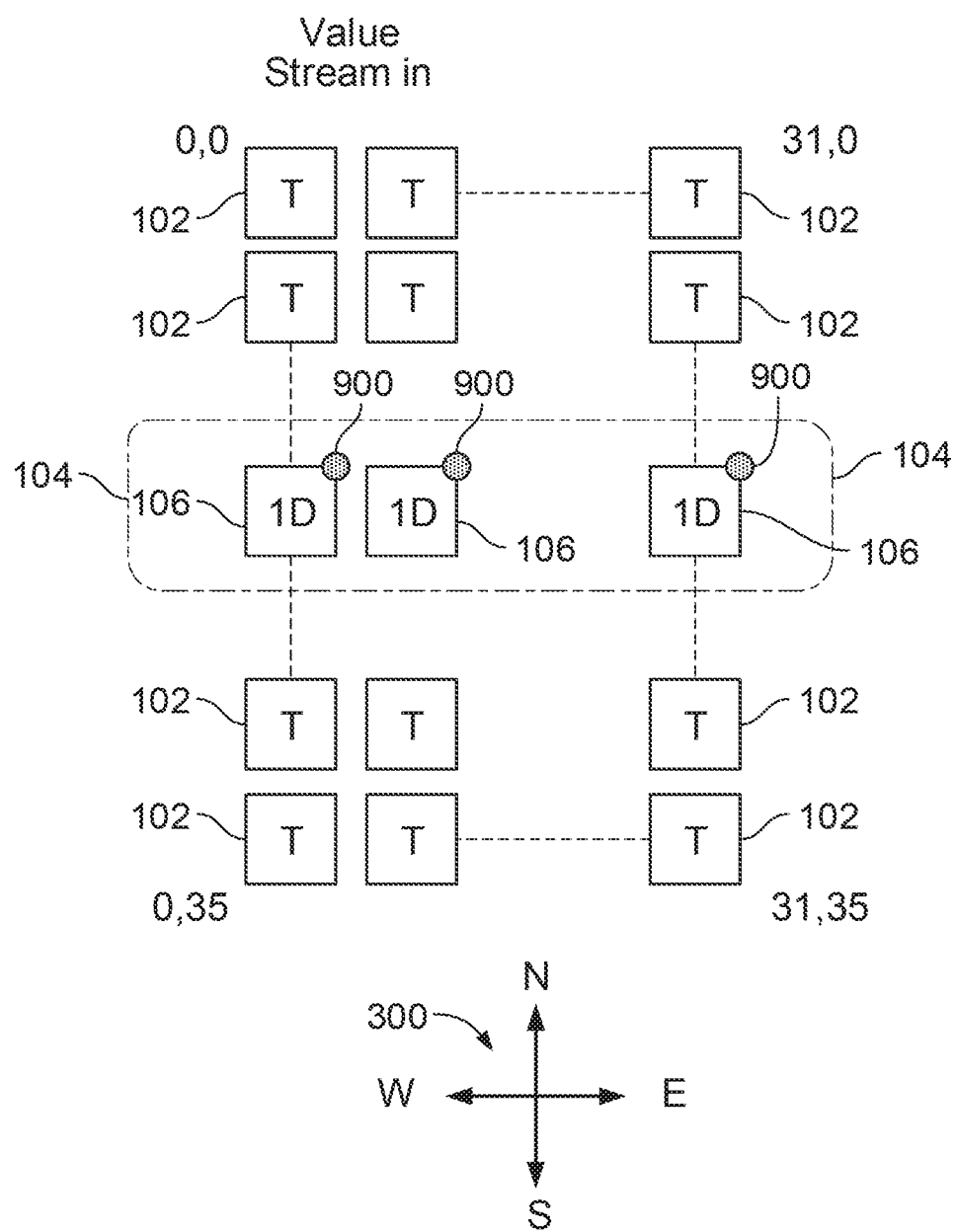

In a fifth step as shown in FIG. 11, at the scheduled counter value, the data (e.g., the accumulated values) received by the vector processing unit 104 are processed by the vector processing unit 104 to provide processed values 900. Processing of the data at the vector processing unit 104 can include applying a bias to the data received at the vector processing unit 104, performing additional accumulation operations, and/or applying a non-linear function (e.g., a rectifier function or sigmoid function as known in neural network systems) to the received data. Other operations also can be applied by the vector processing unit 104. The vector processing unit 104 can include circuitry arranged in multiple segments 106, in which each segment 106 is configured to process data received from a corresponding column of tiles 102 and generate a corresponding processed value 900.

In a sixth step, as shown in FIG. 12A, at the scheduled counter value, the processed values 900 from the vector processing unit 104 are transferred to and stored in one or more tiles of the ASIC 100, e.g., a subset of the tiles of the ASIC 100. For example, the processed values 900 can be sent to the control tiles 103, which are located directly adjacent to the vector processing unit 104. Alternatively, or in addition, the processed values 900 can be sent to one or more of the other tiles 102 within the ASIC 100. The processed values 900 can be transferred to one or more tiles over a general purpose controllable bus line, such as controllable bus lines 310c. Upon reaching a tile (e.g., a control tile or other tile 102), the processed values 900 can be stored in the memory 202 of the tile. For example, the processed values 900 can be transferred to the memory 902 using a multiplexer associated with the controllable bus line 310c. The step of storing the processed values 900 can occur after the inferences of each model layer are obtained. In some implementations, the processed values 900 can be provided as input values to a next layer of the model.

In a seventh step, as shown in FIGS. 13A and 13B, at the scheduled counter value, the processed values 900 can be exported off the ASIC 100. For example, the processed values 900 can be transferred from the memory 202 of the one or more control tiles to the communications interface 108. The processed values 900 can be conveyed to the communications interface 108 on controllable bus lines (e.g., controllable bus lines 310c and/or 310d). The processed values 900 can be transferred to the controllable bus lines through multiplexers associated with the bus lines.

The processed values 900 may be exported off the ASIC 100, e.g., if the inferences for a final layer of a model have been obtained or if the model has been partitioned among multiple ASICs and the inferences for the final layer associated with ASIC 100 have been obtained. The processed values 900 can be received and exported by the SerDes interfaces of the communications interface 108 to another destination including, but not limited to, e.g., another ASIC 100 or a field-programmable gate array chip.

The example process described with respect to FIGS. 7A-13B may require that the activation values and weight inputs being fully propagated throughout the computational arrays of each tile before the cell computations are performed, or the cells may perform computations before all values are fully propagated. In either case, the operations schedules of the individual tiles can be coordinated so that the computations are properly timed. For example, if a particular machine learning program requires the activation values and weight inputs to be fully propagated through the computational arrays of each tile before the cell computations are performed, the operation instructions can schedule the execution of the computation for a time that ensures the activation values and weights are fully propagated. Furthermore, although the ASIC 100 has been described with weight inputs being sent to columns of a computational array and activation inputs being sent to rows of the computational array, in some implementations, the weight inputs are sent to rows of the array and the activation inputs are sent to columns of the array.

Furthermore, although the computational arrays have been described herein as using individual summation circuits within each cell, groups of cells within the computational array (e.g., all the cells within a column) may be coupled directly to a single summation circuit, which sums the received outputs from the cells in the group, thus reducing the number of summation circuits required to store the outputs.

Embodiments of the subject matter and the functional operations described in this specification can be implemented in digital electronic circuitry, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a GPGPU (general purpose graphics processing unit).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, although bus lines are described as "controllable," not all bus lines need to have the same level of control. For instance, there can be varying degrees of controllability, where some bus lines can be controlled only where some bus lines are restricted in terms of the number of tiles from which they can source data or to which they can send data. In an another example, some bus lines may be dedicated to providing data along a single direction, such as north, east, west, or south as described herein. In some cases, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of configuring an integrated circuit comprising a plurality of hardware tiles, the method comprising:
    establishing a data forwarding path through the plurality of hardware tiles by configuring each hardware tile, except for a last hardware tile, of the plurality of hardware tiles to be in a data forwarding state,
    wherein configuring each hardware tile, except for the last hardware tile, to be in a forwarding state comprises installing a respective forwarding state counter specifying a corresponding predefined length of time that the hardware tile is in the data forwarding state;
    supplying, along the data forwarding path, each hardware tile of the plurality of hardware tiles with a respective program data packet comprising program data for the hardware tile; and
    installing, for each hardware tile of the plurality of hardware tiles, the respective program data.

2. The method of claim 1, wherein the forwarding state counter of each hardware tile, except for the last hardware tile, of the plurality of hardware tiles, is installed upon receiving a first data packet passed through the data forwarding path.

3. The method of claim 2, wherein the first data packet comprises a program data packet comprising program data for the last hardware tile of the plurality of hardware tiles.

4. The method of claim 1, wherein installing the respective forwarding state counter for each hardware tile comprises defining the forwarding state counter in a trigger table of the hardware tile.

5. The method of claim 4, wherein when the forwarding state counter of each hardware tile reaches the corresponding predefined length of time, the trigger table triggers installation of program data for the hardware tile and causes the hardware tile to exit the data forwarding state.

6. The method of claim 1, wherein, for each hardware tile comprising a respective forwarding state counter, the corresponding predefined length of time of the forwarding state counter is a function of a number of subsequent hardware tiles in the data forwarding path.

7. The method of claim 1, wherein each hardware tile of the plurality of hardware tiles stores the respective program data for the hardware tile in local memory.

8. The method of claim 1, wherein each hardware tile comprising a respective forwarding state counter forwards at least one program data packet to at least one other hardware tile in the data forwarding path.

9. The method of claim 1, wherein each hardware tile comprises a systolic array of circuit elements.

10. The method of claim 1, wherein the plurality of tiles are arranged in a one dimensional or two dimensional array.

11. The method of claim 1, further comprising installing on at least some hardware tiles of the plurality of hardware tiles, a respective kickoff state counter specifying a corresponding predefined length of time until the hardware tile starts operations defined by the program data installed on the hardware tile.

12. The method of claim 11, wherein the respective kickoff state counter of each hardware tile, except for the last hardware tile, of the plurality of hardware tiles, is installed upon receiving a first data packet.

13. The method of claim 12, wherein the predefined length of time for each kickoff state counter is different.

14. The method of claim 13, wherein the predefined length of time for each kickoff state counter is a function of a number of hardware tiles in the data forwarding path.

15. The method of claim 11, wherein the predefined length of time for each kickoff state counter is defined so that the plurality of hardware tiles execute their respective program data simultaneously.

16. The method of claim 11, wherein installing the respective kickoff state counter of each hardware tile comprises defining the kickoff state counter in a trigger table of the hardware tile.

17. A method of configuring an integrated circuit comprising a plurality of hardware tiles, the method comprising:
    establishing a data forwarding path through each hardware tile of the plurality of tiles, except for a last hardware tile of the plurality of tiles, wherein establishing the data forwarding path comprises
    sequentially configuring each hardware tile of the data forwarding path by (a) installing program data for the tile, (b) configuring the tile to be in a forwarding state, and (c) installing a kickoff state counter specifying a corresponding predefined length of time that the hardware tile is in the data forwarding state.

18. The method of claim 17, wherein, for a particular tile of the data forwarding path, the predefined length of time is a function of a number of tiles within the plurality of tiles that do not yet have program data installed.

19. The method of claim 17, wherein, once each kickoff state counter reaches the corresponding predefined length of time, the tile on which the kickoff state counter is installed begins executing operations according to the program data installed on the tile.

20. A system comprising an integrated circuit comprising a plurality of hardware tiles, and
    a data bus coupling the plurality of hardware tiles,
    wherein the system is configured to perform operations comprising:
    establishing a data forwarding path through the plurality of hardware tiles by configuring each hardware tile, except for a last hardware tile, of the plurality of hardware tiles to be in a data forwarding state,
    wherein configuring each hardware tile, except for the last hardware tile, to be in a forwarding state comprises installing a respective forwarding state counter specifying a corresponding predefined length of time that the hardware tile is in the data forwarding state;
    supplying, along the data forwarding path, each hardware tile of the plurality of hardware tiles with a respective program data packet comprising program data for the hardware tile; and
    installing, for each hardware tile of the plurality of hardware tiles, the respective program data.

21. A computer program product comprising computer readable code that, when executed by a computing system comprising a plurality of hardware tiles coupled by a data bus, causes the computing system to perform operations comprising:
    establishing a data forwarding path through the plurality of hardware tiles by configuring each hardware tile, except for a last hardware tile, of the plurality of hardware tiles to be in a data forwarding state,
    wherein configuring each hardware tile, except for the last hardware tile, to be in a forwarding state comprises installing a respective forwarding state counter specifying a corresponding predefined length of time that the hardware tile is in the data forwarding state;

supplying, along the data forwarding path, each hardware tile of the plurality of hardware tiles with a respective program data packet comprising program data for the hardware tile; and installing, for each hardware tile of the plurality of hardware tiles, the respective program data.

* * * * *